US010928576B2

(12) United States Patent
Hong et al.

(10) Patent No.: US 10,928,576 B2
(45) Date of Patent: Feb. 23, 2021

(54) OPTICAL MEMBER AND DISPLAY INCLUDING THE SAME

(71) Applicant: Samsung Display Co., Ltd., Yongin-si (KR)

(72) Inventors: Sun Young Hong, Suwon-si (KR); Dong Hee Lee, Hwaseong-si (KR); Baek Hee Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 129 days.

(21) Appl. No.: 16/167,410

(22) Filed: Oct. 22, 2018

(65) Prior Publication Data
US 2019/0377120 A1 Dec. 12, 2019

(30) Foreign Application Priority Data
Jun. 8, 2018 (KR) .................... 10-2018-0066151

(51) Int. Cl.
*G02B 6/00* (2006.01)
*F21V 8/00* (2006.01)
*G02B 27/09* (2006.01)

(52) U.S. Cl.
CPC .......... *G02B 6/0026* (2013.01); *G02B 6/0065* (2013.01); *G02B 27/095* (2013.01)

(58) Field of Classification Search
CPC .. G02B 6/0026; G02B 6/0065; G02B 27/095; G02B 6/00; G02B 27/00
See application file for complete search history.

(56) References Cited

U.S. PATENT DOCUMENTS

| 9,199,842 | B2 | 12/2015 | Dubrow et al. |
| 9,223,081 | B2 | 12/2015 | Oh et al. |
| 2016/0003998 | A1 | 1/2016 | Benoit et al. |
| 2016/0161657 | A1 | 6/2016 | Yamada et al. |
| 2016/0258583 | A1* | 9/2016 | Shi .................... G02B 26/02 |

FOREIGN PATENT DOCUMENTS

| KR | 10-0621672 | 9/2006 |
| KR | 10-1210163 | 12/2012 |
| KR | 10-2013-0120486 | 11/2013 |
| KR | 10-2017-0074947 | 6/2017 |
| WO | 2016190058 | 12/2016 |

OTHER PUBLICATIONS

Extended European Search Report dated Oct. 1, 2019, in European Patent Application No. 19165970.5.

* cited by examiner

*Primary Examiner* — Y M. Quach Lee
(74) *Attorney, Agent, or Firm* — H.C. Park & Associates, PLC

(57) ABSTRACT

An optical member including a light guide plate, a low refractive layer disposed on the light guide plate and having a refractive index less than that of the light guide plate, a low refractive underlying layer disposed between the low refractive layer and the light guide plate and having a thickness less than that of the low refractive layer, and a wavelength conversion layer disposed on the low refractive layer.

59 Claims, 20 Drawing Sheets

| | Case 1 | Case 2 | Case 3 | Case 4 | um |
|---|---|---|---|---|---|
| WAVELENGTH CONVERSION LAYER | | | | | 10 |
| 4 | SiOx | SiOx | SiNx | SiNx | 0~0.2 |
| 3 | SiNx | SiNx | SiOx | SiOx | 0~0.2 |
| LOW REFRACTIVE LAYER | | | | | 1 |
| 2 | SiOx | SiNx | SiOx | SiNx | 0~0.2 |
| 1 | SiNx | SiOx | SiNx | SiOx | 0~0.2 |
| Glass 1.5T | | | | | |

FIG. 6A

| Case 1 | result 1 | result 2 | result 3 |
|---|---|---|---|
| BLUE TRANSMITTANCE | 81.4% | 81.4% | 81.3% |
| WAVELENGTH CONVERSION LAYER | 10 | 10 | 10 |
| SiOx | 0.04 | 0.14 | 0 |
| SiNx | 0 | 0 | 0 |
| LOW REFRACTIVE LAYER | 1 | 1 | 1 |
| SiOx | 0.06 | 0.08 | 0.06 |
| SiNx | 0.02 | 0.02 | 0.1 |
| Glass | 1.5T | 1.5T | 1.5T |

FIG. 6B

| Case 2 | result 1 | result 2 | result 3 |
|---|---|---|---|
| BLUE TRANSMITTANCE | 81.4% | 81.3% | 81.3% |
| WAVELENGTH CONVERSION LAYER | 10 | 10 | 10 |
| SiOx | 0.02 | 0.1 | 0.02 |
| SiNx | 0 | 0 | 0 |
| LOW REFRACTIVE LAYER | 1 | 1 | 1 |
| SiNx | 0.08 | 0.06 | 0.08 |
| SiOx | 0.06 | 0 | 0.04 |
| Glass | 1.5T | 1.5T | 1.5T |

FIG. 6C

| Case 3 | result 1 | result 2 | result 3 |
|---|---|---|---|
| BLUE TRANSMITTANCE | 81.4% | 81.4% | 81.4% |
| WAVELENGTH CONVERSION LAYER | 10 | 10 | 10 |
| SiNx | 0.04 | 0.06 | 0.08 |
| SiOx | 0.06 | 0.04 | 0.02 |
| LOW REFRACTIVE LAYER | 1 | 1 | 1 |
| SiOx | 0 | 0.02 | 0.04 |
| SiNx | 0.02 | 0.02 | 0.02 |
| Glass | 1.5T | 1.5T | 1.5T |

FIG. 6D

| Case 4 | result 1 | result 2 | result 3 |
|---|---|---|---|
| BLUE TRANSMITTANCE | 81.4% | 81.3% | 81.3% |
| WAVELENGTH CONVERSION LAYER | 10 | 10 | 10 |
| SiNx | 0.02 | 0.02 | 0.1 |
| SiOx | 0.08 | 0.08 | 0.06 |
| LOW REFRACTIVE LAYER | 1 | 1 | 1 |
| SiNx | 0 | 0 | 0 |
| SiOx | 0.06 | 0.04 | 0 |
| Glass | 1.5T | 1.5T | 1.5T |

|   | Case 1 | Case 2 | Case 3 |
|---|---|---|---|
| 7 | OC | SiOx | SiOx |
| 6 | SiOx | OC | SiNx |
| 5 | SiNx | SiNx | OC |
| WAVELENGTH CONVERSION LAYER ||||

FIG. 16A

| Case 1 | result 1 | result 2 | result 3 |
|---|---|---|---|
| TRANSMITTANCE | 87.9 | 87.7 | 87.5 |
| OC | 2 | 3.5 | 4.5 |
| SiOx | 0.1 | 0.1 | 0.1 |
| SiNx | 0 | 0 | 0 |

FIG. 16B

| Case 2 | result 1 | result 2 | result 3 |
|---|---|---|---|
| TRANSMITTANCE | 88.2 | 87.9 | 87.7 |
| SiOx | 0.05 | 0.2 | 0.35 |
| OC | 0 | 0 | 0 |
| SiNx | 0.1 | 0.1 | 0.1 |

FIG. 16C

| Case 3 | result 1 | result 2 | result 3 |
|---|---|---|---|
| TRANSMITTANCE | 88.2 | 88.2 | 88.2 |
| SiOx | 0 | 0.05 | 0.3 |
| SiNx | 0.05 | 0.05 | 0.05 |
| OC | 1 | 1 | 1 |

OPTICAL MEMBER AND DISPLAY INCLUDING THE SAME

CROSS REFERENCE TO RELATED APPLICATION

This application claims priority from and the benefit of Korean Patent Application No. 10-2018-0066151, filed on Jun. 8, 2018, which is hereby incorporated by reference for all purposes as if fully set forth herein.

BACKGROUND

Field

Exemplary embodiments of the invention relate generally to an optical member and, more specifically, to a display including the same.

Discussion of the Background

A liquid crystal display generally receives light from a backlight assembly and displays an image. Some backlight assemblies include a light source and a light guide plate. The light guide plate may receive light from the light source, and guide the light toward a display panel. In some products, the light source provides white light, and the white light is filtered by a color filter of the display panel to realize color.

Recently, research has been conducted on application of a wavelength conversion film to improve image quality, such as color reproducibility of a liquid crystal display. Generally, a blue light source is used as a light source, and a wavelength conversion film is disposed on a light guide plate to convert blue light into white light. The wavelength conversion film typically includes wavelength conversion particles. Since the wavelength conversion particles are generally vulnerable to moisture, they are protected with a barrier film. However, the barrier film is expensive and may increase the overall thickness of a device. Further, since the wavelength conversion film should be laminated on the light guide plate, a complicated assembling process may be required.

The above information disclosed in this Background section is only for understanding of the background of the inventive concepts, and, therefore, it may contain information that does not constitute prior art.

SUMMARY

An optical member having a laminated structure and a display device including the same according to exemplary implementations of the invention are capable of providing improved light transmission efficiency.

Additional features of the inventive concepts will be set forth in the description which follows, and in part will be apparent from the description, or may be learned by practice of the inventive concepts.

An optical member according to an exemplary embodiment includes a light guide plate, a low refractive layer disposed on the light guide plate and having a refractive index less than that of the light guide plate, a low refractive underlying layer disposed between the low refractive layer and the light guide plate and has a thickness less than that of the low refractive layer, and a wavelength conversion layer disposed on the low refractive layer.

An optical member according to another exemplary embodiment includes a light guide plate, a low refractive layer disposed on the light guide plate and having a refractive index less than that of the light guide plate, a wavelength conversion layer disposed on the low refractive layer, and a low refractive overlying layer disposed between the low refractive layer and the wavelength conversion layer and having a thickness less than that of the low refractive layer.

An optical member according to still another exemplary embodiment includes a light guide plate, a low refractive layer disposed on the light guide plate and having a refractive index less than that of the light guide plate, a wavelength conversion layer disposed on the low refractive layer, a low refractive underlying layer disposed between the low refractive layer and the light guide plate, and a low refractive overlying layer disposed between the low refractive layer and the wavelength conversion layer.

A display according to yet another exemplary include an optical member including a light guide plate, a low refractive layer disposed on the light guide plate and having a refractive index less than that of the light guide plate, a low refractive underlying layer disposed between the low refractive layer and the light guide plate, and a wavelength conversion layer disposed on the low refractive layer, a light source disposed on at least one side of the light guide plate, and a display panel disposed on the optical member.

A display according to yet another exemplary embodiment includes an optical member including a light guide plate, a low refractive layer disposed on the light guide plate and having a refractive index less than that of the light guide plate, a wavelength conversion layer disposed on the low refractive layer, and a low refractive overlying layer disposed between the low refractive layer and the wavelength conversion layer, a light source disposed on at least one side of the light guide plate, and a display panel disposed on the optical member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 6A, 6B, 6C, and 6D are tables illustrating the laminated structures and thicknesses for securing the maximum transmittance for each case of FIG. 5A.

FIGS. 16A, 16B, and 16C are tables illustrating the laminated structures and thicknesses for securing the maximum transmittance for each case of FIG. 15A.

DETAILED DESCRIPTION

Figure 1:
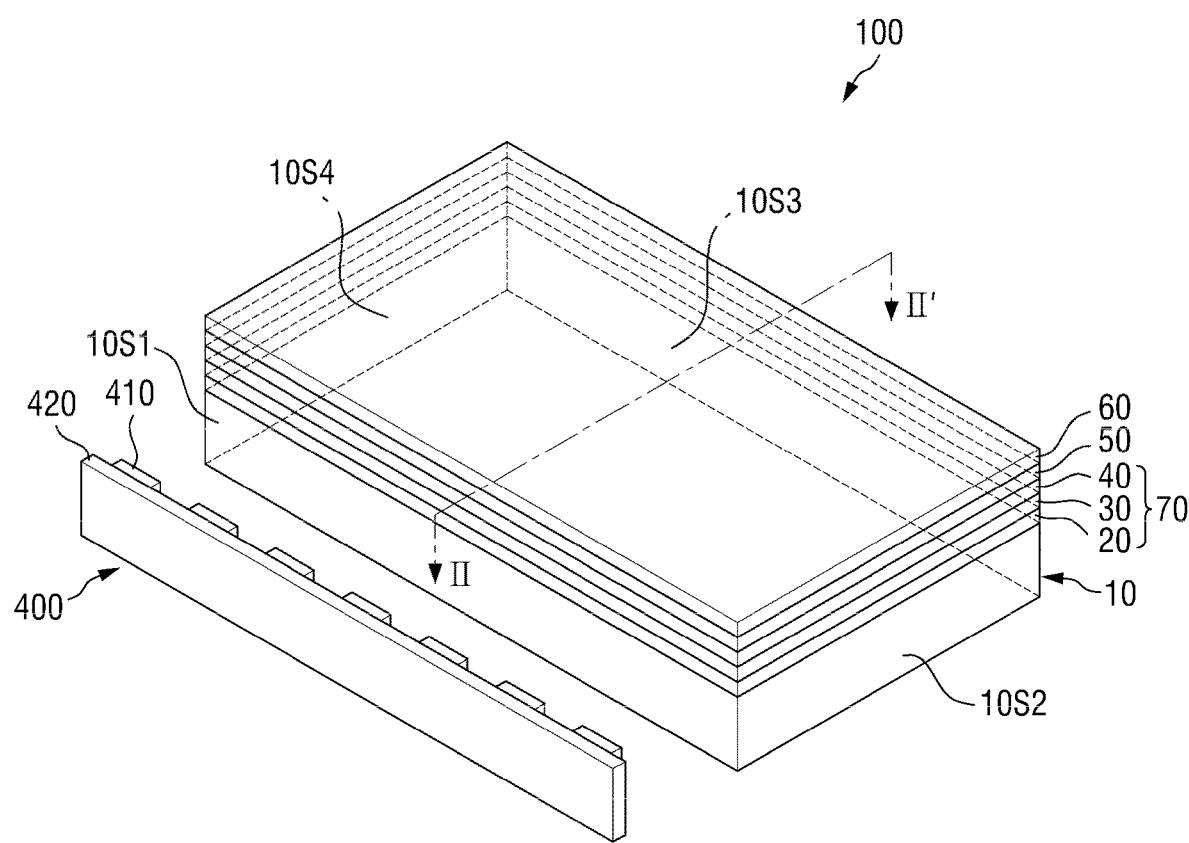
FIG. 1 is a perspective view of an optical member and a light source according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
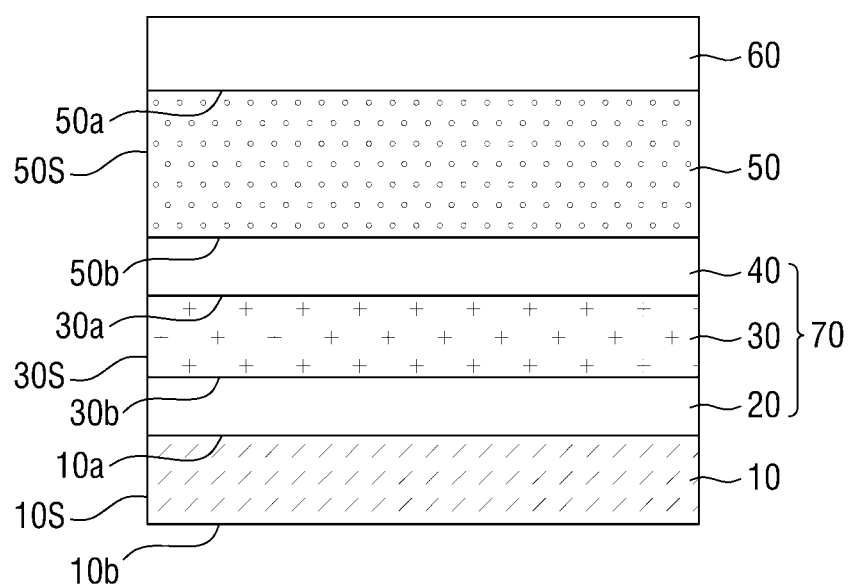
FIG. 2 is a cross-sectional view taken along line II-II' of FIG. 1.

FIG. 1 is a perspective view of an optical member 100 and a light source 400 according to an exemplary embodiment. FIG. 2 is a cross-sectional view taken along line II-II' of FIG. 1.

Referring to FIGS. 1 and 2, the optical member 100 may include a light guide plate 10, a wavelength conversion underlying layer 70 disposed on the light guide plate 10, a wavelength conversion layer 50 disposed on the wavelength conversion underlying layer 70, and a wavelength conversion overlying layer 60 disposed on the wavelength conversion layer 50. The wavelength conversion underlying; layer 70 may include a low refractive underlying layer 20, a low refractive layer 30 disposed on the low refractive underlying layer 20, and a low refractive overlying layer 40 disposed on the low refractive layer 30.

The light guide plate 10 may guide the path of light. The light guide plate 10 may generally have a substantially polygonal column shape. The planar shape of the light guide plate 10 may be substantially rectangular, but the inventive concepts are not limited thereto. In an exemplary embodiment, the light guide plate 10 may have a substantially hexagonal column shape having a rectangular planar shape, and may include an upper surface 10a, a lower surface 10b, and four side surfaces 10S1, 10S2, 10S3, and 10S4. Hereinafter, the four side surfaces of the light guide plate 10 will be indicated as 10S1, 10S2, 10S3, and 10S4, respectively, and one of the four sides will be generally indicated as 10S.

In an exemplary embodiment, each of the upper surface 10a and the lower surface 10b of the light guide plate 10 may be disposed on respective plane. More particularly, the plane on which the upper surface 10a is disposed may be substantially parallel to the plane on which the lower surface 10b is disposed, such that the overall thickness of the light guide plate 10 is uniform. However, the upper surface 10a or the lower surface 10b may be formed of a plurality of planes, or the plane on which the upper surface 10a is disposed may intersect the plane on which the lower surface 10b is disposed. For example, the light guide plate 10 may become thinner from one side surface (e.g., a light incidence surface) toward another side surface (e.g., a counter surface) facing the one side surface, like a wedge-type light guide plate. Alternatively, the lower surface 10b may slope upward from one side surface (e.g., the light incidence surface) toward another side surface (e.g., the counter surface) facing the one side surface up to a predetermined distance, such that the light guide plate 10 becomes thinner up to the predetermined distance and then have substantially uniform thickness past the predetermined distance.

In the optical member 100 according to an exemplary embodiment, the light source 400 may be disposed adjacent to at least one side surface 10S of the light guide plate 10.

In FIG. 1, a plurality of light-emitting diode (LED) light sources 410 are mounted on a printed circuit board 420, and are disposed adjacent to a side surface 10S1 of the light guide plate 10. However, the inventive concepts are not limited thereto, and the LED light sources 410, for example, may be disposed adjacent to side surfaces 10S1 and 10S3 along both long sides or may be disposed adjacent to a side surface 10S2 or 10S4 along one short side, or the side surfaces 10S2 and 10S4 at both short sides. As shown in FIG. 1, the side surface 10S1 of the light guide plate 10 adjacent to the light source 400 may be a light incidence surface, to which light of the light source 400 is directly incident, and the side surface 10S3 at the other long side facing the side surface 10S1 may be a counter surface.

The light guide plate 10 may include an inorganic material. For example, the light guide plate 10 may be made of glass.

Optical interfaces may be formed at surfaces where the layers 20, 30, 40, 50, and 60 of the optical member 100 meet each other. The optical member 100 may include a plurality of optical interfaces 30a, 30b, 50a, and 50b. Each of the optical interfaces 30a, 30b, 50a, and 50b may be substantially parallel to the upper surface 10a of the light guide plate 10.

The wavelength conversion underlying layer 70 is disposed on the upper surface 10a of the light guide plate 10. The wavelength conversion underlying layer 70 may include the low refractive layer 30, the low refractive underlying layer 20, and the low refractive overlying layer 40. The wavelength conversion underlying layer 70 may be formed directly on the upper surface 10a of the light guide plate 10 to contact the upper surface 10a of the light guide plate 10. The wavelength conversion underlying layer 70 is interposed between the light guide plate 10 and the wavelength conversion layer 50 to help total reflection of the optical member 100.

More specifically, in order for the light guide plate 10 to efficiently guide light from the light incidence surface 10S1 toward the counter surface 10S3, effective total internal reflection should occur in the light guide plate 10. One of the conditions under which total internal reflection can occur in the light guide plate 10 is that a refractive index of the light guide plate 10 is greater than a refractive index of a medium that forms an optical interface with the light guide plate 10. As the refractive index of the medium that forms the optical interface with the light guide plate 10 is lower, a total reflection critical angle becomes smaller, leading to more total internal reflections.

For example, when the light guide plate 10 is made of glass having a refractive index of about 1.5, sufficient total reflection may occur on the lower surface 10b of the light guide plate 10, because the lower surface 10b is exposed to an air layer having a refractive index of about 1, and thus, forms an optical interface with the air layer.

On the other hand, since other optical functional layers are integrally laminated on the upper surface 10a of the light guide plate 10, it may be difficult to achieve sufficient total reflection on the upper surface 10a as compared with the lower surface 10b. For example, if a material layer having a refractive index of 1.5 or more is laminated on the upper surface 10a of the light guide plate 10, total reflection may not occur on the upper surface 10a of the light guide plate 10. In addition, if a material layer having a refractive index of, e.g., about 1.49, which is slightly less than that of the light guide plate 10, is laminated on the upper surface 10a of the light guide plate 10, while total internal reflection may occur on the upper surface 10a of the light guide plate 10, sufficient total reflection may not occur due to increased critical angle. The wavelength conversion layer 50 laminated on the upper surface 10a of the light guide plate 10 typically has a refractive index of about 1.5. If this wavelength conversion layer 50 is directly laminated on the upper surface 10a of the light guide plate 10, it may be difficult to have sufficient total reflection on the upper surface 10a of the light guide plate 10.

The low refractive layer 30 interposed between the light guide plate 10 and the wavelength conversion layer 50 to form an interface with the upper surface 10a of the light guide plate 10 has a refractive lower than that of the light guide plate 10, so that total reflection may occur on the upper surface 10a of the light guide plate 10. In addition, the low refractive layer 30 has a refractive less than that of the wavelength conversion layer 50, which is a material layer disposed on the low refractive layer 30, so that more total reflection can occur than when the wavelength conversion layer 50 is disposed directly on the upper surface 10a of the light guide plate 10.

When the low refractive underlying layer 20 is disposed on the light guide plate 10, total reflection may also occur at an interface between the light guide plate 10 and the low refractive underlying layer 20, due to the difference in refractive index between the light guide plate 10 and the low refractive underlying layer 20. However, light incident on the interface at an angle smaller than the total reflection critical angle may proceed toward the low refractive underlying layer 20. Then, light may be reflected or refracted again at an interface between the low refractive underlying layer 20 and the low refractive layer 30. When the refractive index of the low refractive layer 30 is less than the refractive index of the low refractive underlying layer 20, total reflection may also occur at the interface. When the optical member 100 includes the low refractive underlying layer 20, the low refractive underlying layer 20 is interposed between the light guide plate 10 and the low refractive layer 30. However, it is the difference in refractive index between the light guide plate 10 and the low refractive layer 30 that ultimately determines the critical angle of total reflection. Since the difference in refractive index increases as the refractive index of the low refractive layer 30 is smaller, the total reflection critical angle may become smaller, leading to more total reflections.

The wavelength conversion underlying layer 70 interposed between the light guide plate 10 and the wavelength conversion layer 50 to form an interface with the upper surface 10a, of the light guide plate 10 may include the low refractive layer 30. The low refractive layer 30 has a refractive less than that of the light guide plate 10, so that total reflection may occur on a lower surface 30b of the low refractive layer 30. In addition, the low refractive layer 30 has a refractive index less than that of the wavelength conversion layer 50, which is a material layer disposed on the low refractive layer 30, so that more total reflection can occur than when the wavelength conversion layer 50 is disposed directly on the upper surface 10a of the light guide plate 10.

The difference between the refractive index of the light guide plate 10 and the refractive index of the low refractive layer 30 may be 0.2 or more. When the refractive index of the low refractive layer 30 is less than the refractive index of the light guide plate 10 by 0.2 or more, sufficient total reflection may occur on the lower surface 30b of the low refractive layer 30. There is no upper limit on the difference between the refractive index of the light guide plate 10 and the refractive index of the low refractive layer 30. However, considering the typical material of the light guide plate 10 and the typical refractive index of the low refractive layer 30, the difference between the refractive index of the light guide plate 10 and the refractive index of the low refractive layer 30 may be 1 or less. The refractive index of the low refractive layer 30 may be in the range of 1.2 to 1.4. Generally, as the refractive index of a solid medium becomes closer to 1, the manufacturing cost increases exponentially. When the refractive index of the low refractive layer 30 is 1.2 or more, an excessive increase in the manufacturing cost can be prevented. In addition, the low refractive layer 30 having a refractive index of 1.4 or less is advantageous in terms of sufficiently reducing the total reflection critical angle of the upper surface 10a of the light guide plate 10. In an exemplary embodiment, the low refractive layer 30 having a refractive index of about 1.25 may be applied.

To have the above-mentioned low refractive index, the low refractive layer 30 may include voids. The voids may be made of vacuum or may be filled with an air layer, gas, or the like. The spaces of the voids may be defined by particles or a matrix, which is further described in more detail below with reference to FIGS. 3 and 4.

Figure 3:
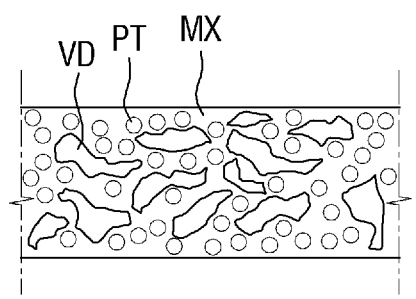
FIG. 3 and FIG. 4 are cross-sectional views of low refractive layers according to exemplary embodiments.
Figure 4:
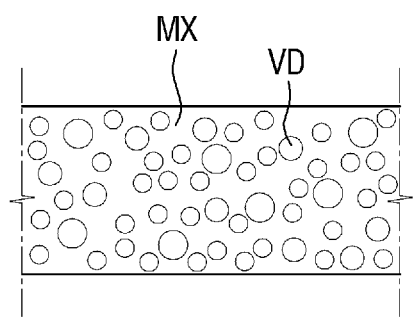

FIGS. 3 and 4 are cross-sectional views of low refractive layers according to exemplary embodiments.

In an exemplary embodiment, a low refractive layer 30 may include a plurality of particles PT, a matrix MX surrounding the particles PT and formed as a single piece, and a plurality of voids VD, as shown in FIG. 3. The particles PT may be a filler that adjusts the refractive index and mechanical strength of the low refractive layer 30.

The particles PT may be dispersed within the matrix MX of the low refractive layer 30, and the voids VD may be formed in open portions of the matrix MX. For example, after the particles PT and the matrix MX are mixed in a solvent, and when the mixture is dried and/or cured, the solvent may be evaporated. At this time, the voids VD may be formed between portions of the matrix MX.

In an exemplary embodiment, a low refractive layer 30 may include a matrix MX and voids VD without particles, as shown in FIG. 4. For example, the low refractive layer 30 may include the matrix MX formed as a single piece, like foam resin, and a plurality of voids VD disposed in the matrix MX.

When the refractive layer 30 includes the voids VD as illustrated in FIGS. 3 and 4, a total refractive index of the low refractive layer 30 may have a value between a refractive index of the particles PT/matrix MX and a refractive index of the voids VD. When the voids VD are filled with vacuum having a refractive index of 1, or an air layer or gas having a refractive index of about 1, even if a material having a refractive index of 1.4 or more is used as the particles PT/matrix MX, the total refractive index of the low refractive layer 30 may have a value of 1.4 or less, for example, about 1.25. In an exemplary embodiment, the particles PT may be made of an inorganic material, such as $SiO_2$, $Fe_2O_3$ or $MgF_2$, and the matrix MX may be made of an organic material, such as polysiloxane. However, the inventive concepts are not limited thereto, and other organic materials or inorganic materials can be used.

Referring back to FIGS. 1 and 2, the low refractive layer 30 may have a thickness of 0.4 μm to 2 μm. When the thickness of the low refractive layer 30 is 0.4 μm or more, which is a visible light wavelength range, the low refractive layer 30 may form an effective optical interface. Therefore, total reflection according to Snell's law may occur well on the lower surface 30b of the low refractive layer 30. A low refractive layer 30 that is too thick may go against the thinning of the optical member 100, increase the material cost, and undermine the luminance of the optical member 100. Therefore, the low refractive layer 30 may be formed to have a thickness of 2 μm or less. In an exemplary embodiment, the thickness of the low to refractive layer 30 may be about 1 μm.

The low refractive underlying layer 20 may be disposed between the light guide plate 10 and the low refractive layer 30. The low refractive underlying layer 20 may be formed directly on the upper surface 10a of the light guide plate 10 to contact the upper surface 10a of the light guide plate 10. In addition, the low refractive underlying layer 20 may contact the lower surface 30b of the low refractive layer 30. The low refractive underlying layer 20 may be interposed between the light guide plate 10 and the low refractive layer 30. The refractive index of the low refractive underlying layer 20 may be greater than that of the low refractive layer 30. The low refractive underlying layer 20 may have a single-layer structure, and include any one of a low refractive material and a high refractive material. Alternatively, the low refractive underlying layer 20 may have a multilayer structure, in which a low refractive material and a high refractive material are alternately laminated. The refractive index of the low refractive material may be 1.3 to 1.7. The refractive index of the high refractive material may be 1.5 to 2.2. In an exemplary embodiment, the low refractive material may be $SiO_x$, and the high refractive material may be $SiN_x$. However, the low refractive material and the high refractive material may be various other materials that satisfy the refractive indices described above.

Since the influence of constructive interference or destructive interference of light changes according to the laminated material and laminated thickness of the low refractive underlying layer 20, light transmittance may be changed. That is, the light transmittance can be adjusted by controlling the laminated material and laminated thickness of the low refractive underlying layer 20. In addition, when the low refractive underlying layer 20 includes an inorganic layer, the inorganic layer may function as a protective layer that prevents penetration of moisture/oxygen into the low refractive layer 30.

The low refractive overlying layer 40 may be disposed between the low refractive layer 30 and the wavelength conversion layer 50. The low refractive overlaying layer 40 may be formed directly on an upper surface of the low refractive layer 30 to contact the upper surface of the low refractive layer 30. In addition, the low refractive overlying layer 40 may contact a lower surface of the wavelength conversion layer 50. The low refractive overlying layer 40 may be interposed between the low refractive layer 30 and the wavelength conversion layer 50. The refractive index of the low refractive overlaying layer 40 may be greater than that of the low refractive layer 30. The low refractive overlaying layer 40 helps to cause total reflection from the upper surface of the low refractive layer 30 toward the wavelength conversion layer 50. The low refractive overlying layer 40 may have a single-layer structure including any one of a low refractive material and a high refractive material. Alternatively, the low refractive overlying layer 40 may have a multilayer structure, in which a low refractive material and a high refractive material are alternately laminated. As in the low refractive underlying layer 20, the refractive index of the low refractive material may be 1.2 to 1.7. The refractive index of the high refractive material may be 1.5 to 2.2. In an exemplary embodiment, the low refractive material may be $SiO_x$, and the high refractive material may be $SiN_x$. However, the low refractive material and the high refractive material may include various other materials satisfying the refractive indices described above.

Since the influence of constructive interference or destructive interference of light changes according to the laminated material and laminated thickness of the low refractive overlying layer 40, light transmittance may be changed. That is, the light transmittance can be adjusted by controlling the laminated material and laminated thickness of the low refractive overlying layer 40. In addition, the low refractive overlying layer 40 may improve the optical efficiency of the optical member 100. When light transmitted through the low refractive layer 30 enters the wavelength conversion layer 50 and encounters dispersed scattering particles, light is scattered as its wavelength is changed. Here, part of the scattered light may travel back toward the light guide plate 10. If the low refractive overlying layer 40 has a refractive index higher than that of the low refractive layer 30, the light may be totally reflected at the interface between the low refractive overlying layer 40 and the low refractive layer 30, and may be reflected back upward, thereby increasing the optical efficiency, such as brightness, of a display.

The low refractive overlying layer 40 may entirely overlap the low refractive layer 30 to prevent moisture and/or oxygen from penetrating into the low refractive layer 30. That is, the low refractive overlying layer 40 may prevent deformation of the low refractive layer 30 and secure structural stability by increasing hardness. In addition, the low refractive overlying layer 40 including an inorganic layer may prevent moisture and/or oxygen from penetrating into the wavelength conversion layer 50 disposed on the low refractive overlying layer 40 and the low refractive layer 30 disposed under the low refractive overlying layer 40.

The wavelength conversion underlying layer 70 may be formed by methods, such as deposition and coating. The wavelength conversion underlying layer 70 may be formed on the light guide plate 10 in the order of the low refractive underlying layer 20, the low refractive layer 30, and the low refractive overlying layer 40. In an exemplary embodiment, the low refractive underlying layer 20 and the low refractive overlying layer 40 may be formed of an inorganic layer including an inorganic material by using a chemical vapor deposition method. The low refractive layer 30 may be formed of an organic layer including an organic material by using a coating method. Examples of the coating method include slit coating, spin coating, roll coating, spray coating, and inkjet. However, the inventive concepts are not limited to a particular coating method, and various other lamination methods can be applied.

The wavelength conversion layer 50 is disposed on the wavelength conversion underlying layer 70. In an exemplary embodiment, when the wavelength conversion underlying layer 70 includes the low refractive overlying layer 40, the wavelength conversion layer 50 may be disposed on the upper surface of the low refractive overlying layer 40. In an exemplary embodiment, when the wavelength conversion underlying layer 70 does not include the low refractive overlying layer 40, the wavelength conversion layer 50 may be disposed on the upper surface of the low refractive layer 30. The wavelength conversion layer 50 may include a binder layer and wavelength conversion particles dispersed in the binder layer. The wavelength conversion layer 50 may further include scattering particles dispersed in the binder layer, in addition to the wavelength conversion particles.

The binder layer is a medium to which the wavelength conversion particles are dispersed, and may be made of various resin compositions that can be generally referred to as binders. However, the inventive concepts are not limited thereto, and any medium to which the wavelength conversion particles and/or the scattering particles can be dispersed can be referred to as the binder layer, regardless of its name, additional other functions, constituent material and the like.

The wavelength conversion particles are particles that convert the wavelength of incident light. For example, the wavelength conversion particles may be quantum dots, a fluorescent material, or a phosphorescent material. Specifically, the quantum dots, which are an example of the wavelength conversion particles, are a material having a crystal structure of several nanometers in size. The quantum dots are composed of several hundreds to thousands of atoms, and exhibit a quantum confinement effect in which an energy band gap increases due to the small size of the quantum dots. When light of a wavelength having a higher energy than a band gap is incident on the quantum dots, the quantum dots become in excited-state by absorbing the light, and fall to a ground state while emitting light of a specific wavelength. The emitted light of the specific wavelength has a value corresponding to the band gap. Emission characteristics of the quantum dots from the quantum confinement effect can be adjusted by controlling the size and composition of the quantum dots.

The quantum dots may include at least one of a group II-VI compound, a group II-V compound, a group III-VI compound, a group III-V compound, a group IV-VI compound, a group compound, a group II-IV-VI compound, and a group II-IV-V compound.

A quantum dot may include a core and a shell overcoating the core. The core may be, but is not limited to, at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si, and Ge. The shell may include, but is not limited to, at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe.

The wavelength conversion particles may include a plurality of wavelength conversion particles that convert incident light into light having different wavelengths. For example, the wavelength conversion particles may include first wavelength conversion particles that convert incident light of a specific wavelength into light of a first wavelength and emit light of the first wavelength, and second wavelength conversion particles that convert the incident light of the specific wavelength into light of a second wavelength and emit light of the second wavelength. In an exemplary embodiment, light emitted from the light source 400 and then incident on the wavelength conversion particles may be light of a blue wavelength, the first wavelength may be a green wavelength, and the second wavelength may be a red wavelength. For example, the blue wavelength may be a wavelength having a peak at 420 to 470 nm, the green wavelength may be a wavelength having a peak at 520 to 570 nm, and the red wavelength may be a wavelength having a peak at 620 to 670 nm. However, the inventive concepts are not limited thereto, and all wavelength ranges that can be recognized as blue, green and red may be used.

In the above exemplary embodiment, when blue light incident on the wavelength conversion layer 50 passes through the wavelength conversion layer 50, a portion of the blue light may be incident on the first wavelength conversion particles to be converted into the green wavelength and emitted as light of the green wavelength, another portion of the blue light may be incident on the second wavelength conversion particles to be converted into the red wavelength and emitted as light of the red wavelength, and the remaining portion of the blue light may be emitted as it is without entering the first and second wavelength conversion particles. Therefore, light that has passed through the wavelength conversion layer 50 includes all of the light of the blue wavelength, the light of the green wavelength, and the light of the red wavelength. If the ratio of the emitted light of the different wavelengths is appropriately adjusted, white light or outgoing light of other colors can be displayed. The light converted by the wavelength conversion layer 50 is concentrated in a narrow range of specific wavelengths and has a sharp spectrum with a narrow half width. Therefore, when light of such a spectrum is filtered using a color filter to realize color, color reproducibility can be improved.

Unlike in the above exemplary embodiment, incident light may be light having a short wavelength, such as ultraviolet light, and three types of wavelength conversion particles for converting the incident light into the blue, green and red wavelengths may be disposed in the wavelength conversion layer 50 to emit white light.

The wavelength conversion layer 50 may further include scattering particles. The scattering particles may be non-quantum dot particles without a wavelength conversion function. The scattering particles may scatter incident light to cause more incident light to enter the wavelength conversion particles. In addition, the scattering particles may uniformly control an output angle of light for each wavelength. Specifically, when a portion of incident light that enters the wavelength conversion particles is emitted after its wavelength is converted by the wavelength conversion particles, the emission direction of the portion of the incident light has random scattering characteristics. If there are no scattering particles in the wavelength conversion layer 50, the green and red wavelengths emitted after colliding with the wavelength conversion particles may have scattering emission characteristics, but the blue wavelength emitted without colliding with the wavelength conversion particles may not have the scattering emission characteristics. Therefore, the emission amount of the blue/green/red wavelength may be varied according to the output angle. The scattering particles may give the scattering emission characteristics even to the blue wavelength emitted without colliding with the wavelength conversion particles, thereby controlling the output angle of light for each wavelength to be similar. The scattering particles may be made of $TiO_2$ or $SiO_2$.

The wavelength conversion layer 50 may be thicker than the low refractive layer 30. The thickness of the wavelength conversion layer 50 may be about 10 μm to 50 μm. In an Exemplary embodiment, the thickness of the wavelength conversion layer 50 may be about 10 μm.

The wavelength conversion layer 50 may be formed by a method such as coating. For example, the wavelength conversion layer 50 may be formed by slit-coating a wavelength conversion composition on the light guide plate 10 having the wavelength conversion underlying layer 70, and drying and curing the wavelength conversion composition. However, the inventive concepts are not limited to a particular method of forming the wavelength conversion layer 50, and various other lamination methods can be applied.

The wavelength conversion overlying layer 60 may be disposed on the wavelength conversion layer 50. The wavelength conversion overlying layer 60 may be a passivation layer that prevents the penetration of moisture and/or oxygen (hereinafter, referred to as 'moisture/oxygen'). The wavelength conversion overlying layer 60 may include a plurality of laminated layers. Each of the laminated layers may include an inorganic layer or an organic layer. The wavelength conversion overlying layer 60 may include at least one inorganic layer. That is, the wavelength conversion overlying layer 60 may include a single inorganic layer, a plurality of inorganic layers, or laminated organic and inorganic layers.

Each laminated layer may include a high refractive material, a low refractive material, and/or a transparent organic material. The wavelength conversion overlying layer 60 may have a single layer structure including a low refractive material, a high refractive material, or a transparent organic material, or may have a multilayer structure, in which materials having different refractive indices are laminated. In an exemplary embodiment, the high refractive material and the low refractive material may be silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride. In an exemplary embodiment, the high refractive material may be silicon nitride ($SiN_x$), and the low refractive material may be silicon oxide ($SiO_x$). The transparent organic material may be silicone resin, acrylic resin, or epoxy resin.

The wavelength conversion overlying layer 60 may entirely overlap the wavelength conversion layer 50 and cover an upper surface of the wavelength conversion layer 50. In an exemplary embodiment, the wavelength conversion overlying layer 60 may cover only the upper surface of the wavelength conversion layer 50. However, in an exemplary embodiment, the wavelength conversion overlying layer 60 may extend further outward so as to cover side surfaces of the wavelength conversion layer 50 and side surfaces of the wavelength conversion underlying layer 70.

The thickness of the wavelength conversion overlying layer 60 may be 0.1 μm to 5 μm. In an exemplary embodiment, when the wavelength conversion overlying layer 60 does not include an organic layer, the thickness of the wavelength conversion overlying layer 60 may be 0.15 μm to 0.5 μm. In an exemplary embodiment, when the wavelength conversion overlying layer 60 includes an organic layer, the thickness of the wavelength conversion overlying layer 60 may be 1 μm to 5 μm. The thickness of the wavelength conversion overlying layer 60 may be less than that of the wavelength conversion layer 50. If the thickness of the wavelength conversion overlying layer 60 is 0.1 μm or more, the wavelength conversion overlying layer 60 can exert a significant moisture/oxygen penetration preventing function. The wavelength conversion overlying layer 60 having a thickness of 2 μm or less is advantageous in terms of thinning and transmittance. However, the inventive concepts are not limited to a particular thickness of the wavelength conversion overlying layer 60, and the wavelength conversion overlying layer 60 may have various thicknesses. The refractive index and thickness of the laminated material of the wavelength conversion overlying layer 60 may affect the amount of light extracted through an upper surface, that is, transmittance. This will be described in detail later.

The wavelength conversion overlying layer 60 may be formed by methods such as coating and deposition. For example, an inorganic layer including an inorganic material may be formed on the light guide plate 10, on which the wavelength conversion underlying layer 70 and the wavelength conversion layer 50 are sequentially formed, by using a chemical vapor deposition method. An organic layer including an organic material may be formed on the light guide plate 10 by a coating method. However, the inventive concepts are not limited to a particular method of forming the wavelength conversion overlying layer 60, and various other lamination methods can be applied.

As described above, the optical member 100 can perform a light guide function and a wavelength conversion function simultaneously. The optical member 100 may include the wavelength conversion underlying layer 70 and the wavelength conversion overlying layer 60. The wavelength conversion underlying layer 70 may include the low refractive layer 30, the low refractive underlying layer 20, and the low refractive overlying layer 40. The low refractive underlying layer 20 and the low refractive overlying layer 40 may include a material having a refractive index higher than that of the low refractive layer 30. Since the low refractive underlying layer 20 and the low refractive overlying layer 40 change the influence of constructive interference or destructive interference of light incident on the optical member 100, they can improve light transmittance. The wavelength conversion overlying layer 60 may include a layer made of at least one of a high refractive material and a low refractive material. In addition, the wavelength conversion overlying layer 60 may be a multilayer further including a transparent organic material. The wavelength conversion overlying layer 60 entirely covers the wavelength conversion layer 50 to prevent penetration of moisture/oxygen. In addition, the wavelength conversion overlying layer 60 allows light transmitted through the wavelength conversion layer 50 to be effectively output to the outside of the optical member 100, thereby improving the optical efficiency.

In addition, the wavelength conversion overlying layer 60 disposed on the wavelength conversion layer 50 of the optical member 100 may lower the manufacturing cost and reduce the thickness, as compared with a wavelength conversion film provided as a separate film. For example, the wavelength conversion film includes a barrier film attached to the upper and lower surfaces of the wavelength conversion layer 50. The barrier film is not only expensive but also has a thickness of 100 μm or more. Thus, the total thickness of the wavelength conversion film may be about 270 μm. On the other hand, the total thickness of the optical member 100 according to an exemplary embodiment excluding the light guide plate 10 can be maintained at about 12 μm to 13 μm. Thus, the thickness of a display employing the optical member 100 can be reduced. In addition, since the expensive barrier film can be omitted from the optical member 100, the manufacturing cost can be managed at a level lower than that when the wavelength conversion film is used.

The laminated structure and thickness of the wavelength conversion underlying layer 70 for obtaining maximum light transmittance will now be described. When light passes through media having different refractive indices, reflection and refraction of the light occur at a point where the media having the different refractive indices meet. If the refractive indices and thicknesses of the media can be identified, the transmittance of the laminated structure can be obtained using the Fresnel equations relating to reflection and refraction of light. That is, a simulation for obtaining transmittance according to the laminated structure and thickness of the wavelength conversion underlying layer 70 can be performed.

Figures 5A, 5B:
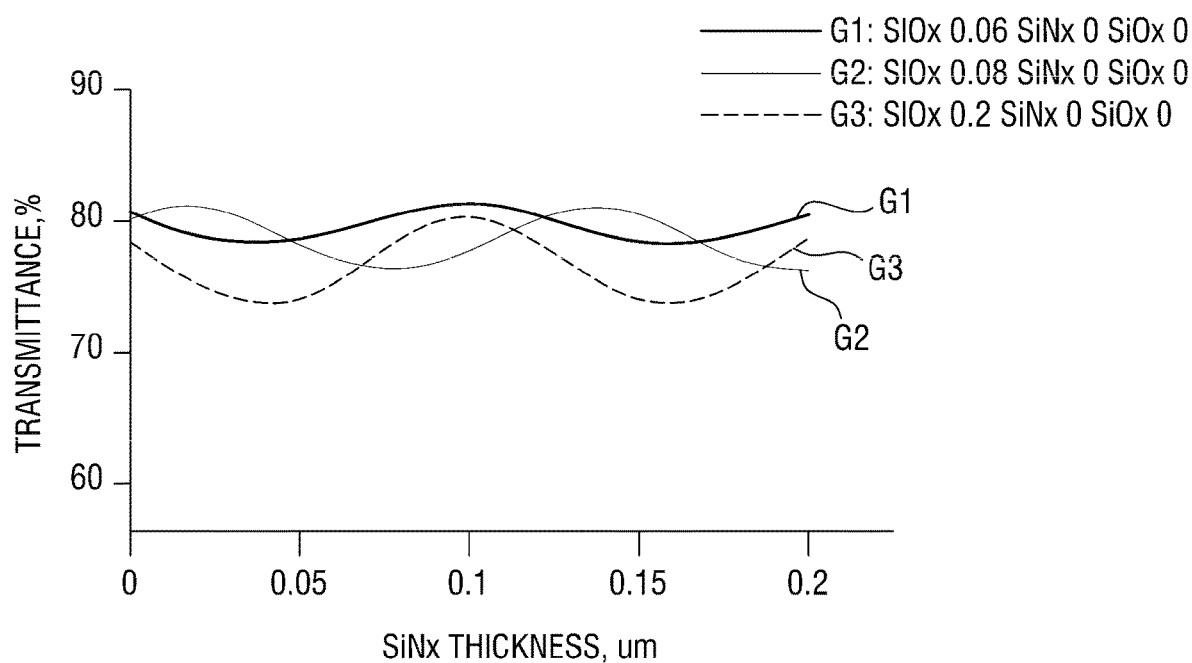
FIG. 5A is a table illustrating a wavelength conversion underlying layer according to exemplary embodiments.
FIG. 5B is a graph showing the change in transmittance with respect to the thickness of $SiN_x$ on a light guide plate.

FIG. 5A is a table illustrating a wavelength conversion underlying layer according to exemplary embodiments, and FIG. 5B is a graph showing the change in transmittance with respect to the thickness of $SiN_x$ on a light guide plate. FIGS. 6A to 6D are tables showing the laminated structures and thicknesses for securing the maximum transmittance in each lamination case of the wavelength conversion underlying layer of FIG. 5A.

FIG. 5A is a table illustrating conditions for performing a simulation, In FIG. 5A, a case where each of a low refractive underlying layer and a low refractive overlying layer has two layers will be described as an example. When the low refractive underlying layer and the low refractive overlying layer are omitted or only one of the layers is provided, the omitted layer or layers will be expressed as having a thickness of 0 μm.

Referring to FIGS. 2 and 5A, the wavelength conversion underlying layer 70 is laminated on the light guide plate 10 in the order of the low refractive underlying layer 20, the low refractive layer 30, and the low refractive overlying layer 40. The wavelength conversion underlying layer 70 may be interposed between the light guide plate 10 and the wavelength conversion layer 50. The low refractive underlying layer 20 and the low refractive overlying layer 40 may each include two layers or less.

In the simulation conditions, the thickness of each layer is selected in the range of 0 μm to 0.2 μm. As described above, a thickness of 0 μm indicates that a corresponding layer is not included. In the simulation conditions, the thickness of the low refractive layer 30 is set to 1 μm. The layers included in the low refractive underlying layer 20 and the low refractive overlying layer 40 may be made of a high refractive material and a low refractive material. In an exemplary embodiment, the high refractive material may be silicon nitride ($SiN_x$), and the low refractive material may be silicon oxide ($SiO_x$). The high refractive material will hereinafter be described as $SiN_x$, and the low refractive material will hereinafter be described as $SiO_x$. A layer including the high refractive material and a layer including the low refractive material may be alternately laminated. The refractive indices of the high refractive material and the low refractive material may be greater than that of the low refractive layer 30. The conditions for obtaining the light transmittance of the wavelength conversion underlying layer 70 may be divided into four conditions according to the laminated structure.

Referring to FIG. 5A, the wavelength conversion underlying layer of case 1 includes a low refractive underlying layer 20 laminated on the light guide plate in the order of the high refractive material and the low refractive material, and a low refractive overlying layer 40 laminated on the low refractive layer in the order of the high refractive material and the low refractive material.

The wavelength conversion underlying layer of case 2 includes a low refractive underlying layer 20 laminated on the light guide plate in the order of a low refractive material and a high refractive material, and a low refractive overlying layer 40 laminated on the low refractive layer in the order of a high refractive material and a low refractive material.

The wavelength conversion underlying layer of case 3 includes a low refractive underlying layer 20 laminated on the light guide plate in the order of a high refractive material and a low refractive material, and a low refractive overlying layer 40 laminated on the low refractive layer in the order of a low refractive material and a high refractive material.

The wavelength conversion underlying layer of case 4 includes a low refractive underlying layer 20 laminated on the light guide plate in the order of a low refractive material and a high refractive material, and a low refractive overlying layer 40 laminated on the low refractive layer in the order of a low refractive material and a high refractive material.

FIG. 5B is a graph showing the change in transmittance in each lamination condition according to the $SiN_x$ thickness of the low refractive underlying layer disposed on the light guide plate in case 1. FIG. 5B is an example of simulation results, and the transmittance of the wavelength conversion underlying layer having laminated structures of other cases can also be obtained in the same manner as in FIG. 5B. Here, the transmittance denotes the ratio of blue light transmitted through the lower wavelength conversion underlying layer to blue light incident from a light source. In the graph of FIG. 5B, $SiN_x$ refers to a high refractive material, and $SiO_x$ refers to a low refractive material.

Referring to FIGS. 2 and 5B, the wavelength conversion underlying layer 70 on which the simulation of FIG. 5B is performed has the structure of case 1 described above. The wavelength conversion underlying layer 70 of case 1 includes the low refractive underlying layer 20 laminated in the order of $SiN_x$ and $SiO_x$, and the low refractive overlying layer 40 laminated in the order of $SiN_x$ and $SiO_x$. The $SiN_x$ of the low refractive underlying layer 20 corresponds to $SiN_x$ thickness corresponding to the X axis of the graph of FIG. 5B. That is, in the graph, the thickness of $SiN_x$ of the low refractive underlying layer 20 has a variable value, and the thickness of $SiO_x$ of the low refractive underlying layer 20 and the thicknesses of $SiN_x$ and $SiO_x$ of the low refractive overlying layer 40 have specified values. FIG. 5B illustrates three graphs G1, G2, and G3 showing the change in transmittance with respect to the $SiN_x$ thickness of the low refractive underlying layer 20 when the thickness of SiO of the low refractive underlying layer 20 is 0.06 μm, 0.08 μm, and 0.2 μm, respectively. Here, the thicknesses of $SiN_x$ and $SiO_x$ of the low refractive overlying layer 40 are each 0 μm, indicating that the wavelength conversion underlying layer 70 does not include the low refractive overlying layer 40.

G1 is a graph showing the change in transmittance when the thickness of $SiO_x$ of the low refractive underlying layer 20 is 0.06 μm. G2 is a graph showing the change in transmittance when the thickness of $SiO_x$ of the low refractive underlying layer 20 is 0.08 μm. G3 is a graph showing the change in transmittance when the thickness of $SiO_x$ of the low refractive underlying layer 20 is 0.2 μm. G1 has the maximum transmittance when the $SiN_x$ thickness of the low refractive underlying layer 20 is about 0.1 μm. G2 has the maximum transmittance when the $SiN_x$ thickness of the low refractive underlying layer 20 is about 0.02 μm or about 0.14 μm. G3 has the maximum transmittance when the $SiN_x$ thickness of the low refractive underlying layer 20 is about 0.1 μm. That is, when the laminated structure, such as the laminated order and the laminated thickness, is changed, the transmittance also changes. Therefore, the maximum transmittance in each lamination condition can be identified, and, accordingly, each lamination condition having the maximum transmittance can be determined.

FIGS. 6A to 6D are tables showing the laminated structures and thicknesses for securing the maximum blue light transmittance in each lamination case of the wavelength conversion underlying layer. In FIG. 6, three result values with high transmittance are shown for each lamination case. Glass of 1.5 T indicates the light guide plate having a thickness of 1.5 mm. The result values are the results of a simulation performed in a case the low refractive layer is 1 μm and the wavelength conversion layer is 10 μm. In FIG. 6, $SiO_x$ is an example of a low refractive material, and $SiN_x$ is an example of a high refractive material.

Referring to FIGS. 2 and 6A, result 3 of case 1 is a result value according to G1 described in FIG. 5B. Result 3 of case 1 shows the transmittance of the wavelength conversion underlying layer 70 including the low refractive underlying layer 20 in which SiNx of 0.1 μm and SiOx of 0.06 μm are laminated sequentially on the light guide plate, and including the low refractive overlying layer 40 in which $SiN_x$ and $SiO_x$ are 0 μm, that is, not including the low refractive overlying layer 40. The wavelength conversion underlying layer 70 of result 3 has a blue light transmittance of 81.3%.

If the maximum blue light transmittance in each case is obtained like this, all of the four cases may have a maximum transmittance of about 81.4%. Laminated structures of the wavelength conversion underlying layer according to various exemplary embodiments will now be described in detail with reference to FIGS. 7 through 14.

FIGS. 7 through 14 are cross-sectional views of wavelength conversion underlying layers 71 through 78 according to exemplary embodiments. FIGS. 7 through 14 show that elements of a wavelength conversion underlying layer can be variously arranged. The wavelength conversion underlying layers 71 through 78 may each include a low refractive layer 30, and may further include a low refractive underlying layer 20 (see FIG. 2) and a low refractive overlying layer 40 (see FIG. 2). In some exemplary embodiments, a wavelength conversion underlying layer does not include a low refractive underlying layer or a low refractive overlying layer. However, in order to effectively induce total reflection and improve light transmittance, the wavelength conversion underlying layers 71 through 78 may each include at least one of the low refractive underlying layer 20 (see FIG. 2) and the low refractive overlying layer 40 (see FIG. 2). The low refractive underlying layer 20 (see FIG. 2) and the low refractive overlying layer 40 (see FIG. 2) may have a single-layer structure or a multilayer structure in which a high refractive material and a low refractive material are alternately laminated. $SiN_x$ will hereinafter be described as an example of the high refractive material, and $SiO_x$ will hereinafter be described as an example of the low refractive material. However, the inventive concepts are not limited to the above example.

Figure 7:
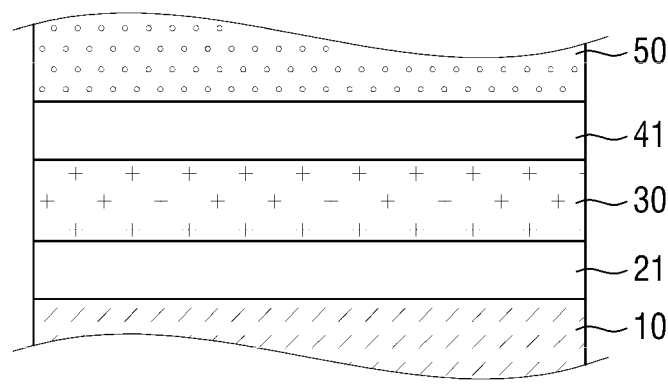
FIG. 7, FIG. 8, FIG. 9, FIG. 10, FIG. 11, FIG. 12, FIG. 13, and FIG. 14 are cross-sectional views of wavelength conversion underlying layers according to exemplary embodiments.

In FIG. 7, a low refractive underlying layer 21 and a low refractive overlying layer 41 of the wavelength conversion underlying layer 71 have a single-layer structure. The wavelength conversion underlying layer 71 of FIG. 7 is a structure corresponding to result 2 of case 2 in FIG. 6B. That is, in the wavelength conversion underlying layer 71 of FIG. 7, the low refractive underlying layer 21 is a single layer made of a high refractive material, and the low refractive overlying layer 41 is a single layer made of a low refractive material. In an exemplary embodiment, the low refractive underlying layer 21 is made of $SiN_x$ and has a thickness of 0.06 μm. The low refractive overlying layer 41 is made of $SiO_x$ and has a thickness of 0.1 μm. The blue light transmittance of the wavelength conversion underlying layer 71 according to the illustrated exemplary embodiment is 81.3%.

Figure 8:
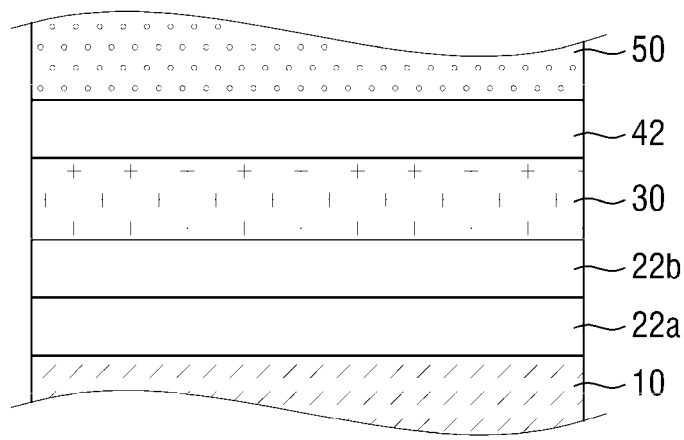

In FIG. 8, a low refractive underlying layer 22a and 22b of the wavelength conversion underlying layer 72 includes alternately laminated materials having different refractive indices, and a low refractive overlying layer 42 is a single-layer structure. The wavelength conversion underlying layer 72 of FIG. 8 is a structure corresponding to result 1 and result 2 of case 1 in FIG. 6A. That is, in the wavelength conversion underlying layer 72 of FIG. 8, the low refractive underlying layer 22a and 22b may be a multilayer including a first low refractive underlying layer 22a and a second low refractive underlying layer 22b having different refractive indices, and the low refractive overlying layer 42 may be a single layer of a low refractive material. The refractive index of the first low refractive underlying layer 22a may be greater than the refractive index of the second low refractive underlying layer 22b. The second low refractive underlying layer 22b may include the same material as the low refractive overlying layer 42. In an exemplary embodiment, the first low refractive underlying layer 22a is made of $SiN_x$ and has a thickness of 0.02 μm. The second low refractive underlying layer 22b is made of $SiO_x$ and has a thickness of 0.06 μm. The low refractive overlying layer 42 is made of $SiO_x$, which is a low refractive material, and has a thickness of 0.04 μm. Accordingly, the blue light transmittance of the wavelength conversion underlying layer 72 is 81.4%. A wavelength conversion underlying layer 72 according to an exemplary embodiment is the same as the wavelength conversion underlying layer 72 of the above exemplary embodiment in terms of laminated materials, but is different in the thickness of each layer. The thickness of the first low refractive underlying layer 22a is 0.02 μm. The thickness of the second low refractive underlying layer 22b is 0.08 μm. The thickness of the low refractive overlying layer 42 is 0.14 μm. Accordingly, the blue light transmittance of the wavelength conversion underlying layer 72 is 81.4%.

Figure 9:
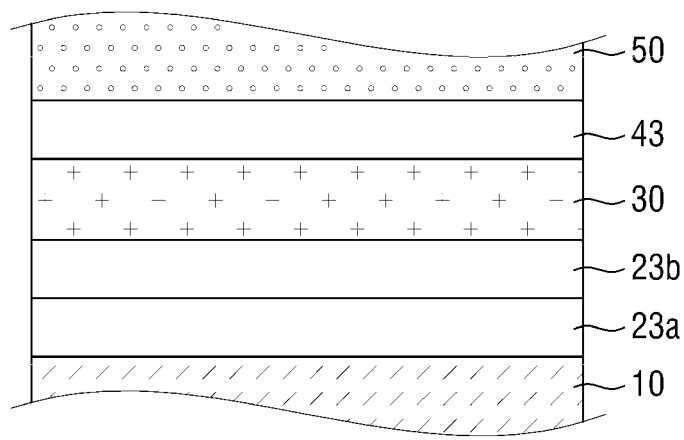

In FIG. 9, a low refractive underlying layer 23a and 23b of the wavelength conversion underlying layer 73 includes alternately laminated materials having different refractive indices, and a low refractive overlying layer 43 has a single-layer structure. The wavelength conversion underlying layer 73 of FIG. 9 is a structure corresponding to result 1 and result 3 of Case 2 in FIG. 6B. That is, in the wavelength conversion underlying layer 73 of FIG. 9, the low refractive underlying layer 23a and 23b may be a multilayer including a first low refractive underlying layer 23a and a second low refractive underlying layer 23b having different refractive indices, and the low refractive overlying layer 43 may be a single layer of a low refractive material. The wavelength conversion underlying layer 73 of FIG. 9 may include the same number of layers as that in FIG. 8. In the illustrated exemplary embodiment of FIG. 9, however, the refractive index of the first low refractive underlying layer 23a may be less than that of the second low refractive underlying layer 23b. In addition, the first low refractive underlying layer 23a may include the same material as the low refractive overlying layer 43. In an exemplary embodiment, the first low refractive underlying layer 23a is made of $SiO_x$ and has a thickness of 0.06 μm. The second low refractive underlying layer 23b is made of $SiN_x$ and has a thickness of 0.08 μm. The low refractive overlaying layer 43 is made of $SiO_x$ and has a thickness of 0.02 μm. Accordingly, the blue light transmittance of the wavelength conversion underlying layer 73 is 81.4%. A wavelength conversion underlying layer 73 according to an exemplary embodiment is the same as the wavelength conversion underlying layer 73 of the above exemplary embodiment in terms of laminated materials, but is different in the thickness of each layer. The thickness of the first low refractive underlying layer 23a is 0.04 μm. The thickness of the second low refractive underlying layer 23b is 0.08 μm. The thickness of the low refractive overlying layer 43 is 0.02 μm. Accordingly, the blue light transmittance of the wavelength conversion underlying layer 73 is 81.3%.

Figure 10:
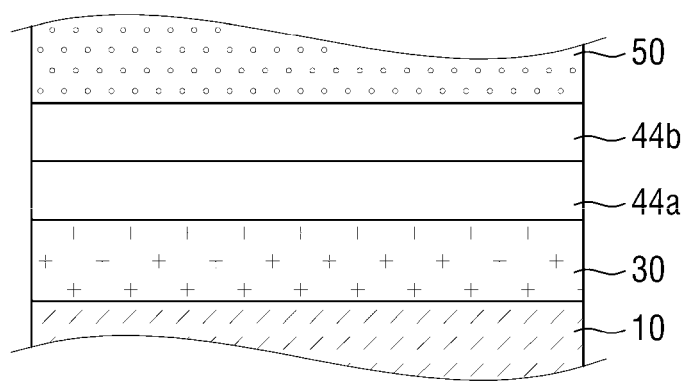

In FIG. 10, the wavelength conversion underlying layer 74 does not include a low refractive underlying layer, and a low refractive overlying layer 44a and 44b has a multilayer structure. The wavelength conversion underlying layer 74 of FIG. 10 is a structure corresponding to result 3 of Case 4 in FIG. 6D. That is, in the wavelength conversion underlying layer 74 of FIG. 10, the low refractive underlying layer is not provided, that is, has a thickness of 0 μm, and the low refractive overlying layer 44a and 44b may be a multilayer including a first low refractive overlying layer 44a and a second low refractive overlying layer 44b having different refractive indices. The refractive index of the first low refractive overlying layer 44a may be less than the refractive index of the second low refractive overlying layer 44b. In an exemplary embodiment, the first low refractive overlaying layer 44a is made of $SiO_x$ and has a thickness of 0.06 μm. The second low refractive overlying layer 44b is made of $SiN_x$ and has a thickness of 0.1 μm. Accordingly, the blue light transmittance of the wavelength conversion underlying layer 74 is 81.3%.

Figure 11:
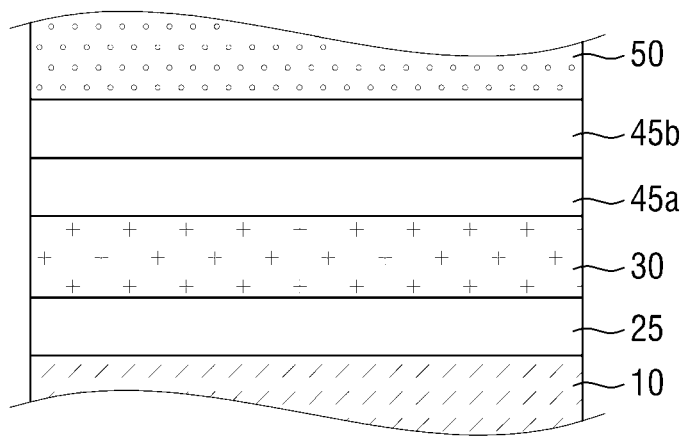

In FIG. 11, a low refractive underlying layer 25 of the wavelength conversion underlying layer 75 is a single-layer structure, and a low refractive overlying layer 45a and 45b is a multilayer structure in which materials having different refractive indices are alternately laminated. The wavelength conversion underlying layer 75 of FIG. 11 is a structure corresponding to result 1 of Case 3 in FIG. 6C. That is, in the wavelength conversion underlying layer 75 of FIG. 11, the low refractive underlying layer 25 may have a single-layer structure including a high refractive material, and the low refractive overlying layer 45a and 45b may be a multilayer including a first low refractive overlying layer 45a and a second low refractive overlying layer 45b having different refractive indices. The refractive index of the first low refractive overlying layer 45a may be less than the refractive index of the second low refractive overlying layer 45b. The low refractive underlying layer 25 may be made of the same material as the second low refractive overlying layer 45b. In an exemplary embodiment, the low refractive underlying layer 25 made of $SiN_x$ and has a thickness of 0.02 μm. The first low refractive overlying layer 45a is made of $SiO_x$ and has a thickness of 0.06 μm. The second low refractive overlying layer 45b is made of $SiN_x$ and has a thickness of 0.04 μm. Accordingly, the blue light transmittance of the wavelength conversion underlying layer 75 is 81.4%.

Figure 12:
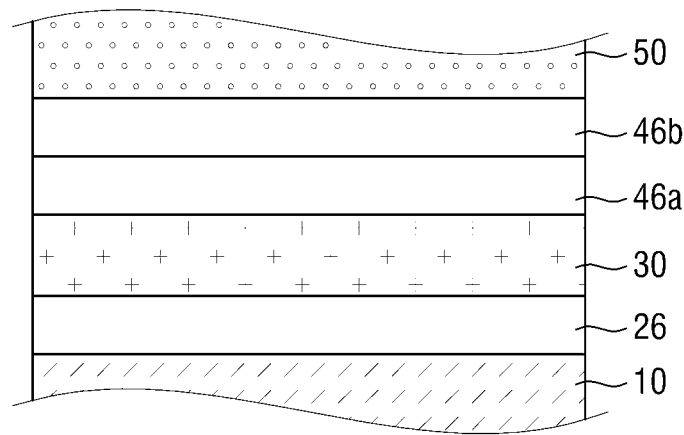

In FIG. 12, a low refractive underlying layer 26 of the wavelength conversion underlying layer 76 has a single-layer structure, and a low refractive overlying layer 46a and 46b has a multilayer structure in which materials having different refractive indices are alternately laminated. The wavelength conversion underlying layer 76 of FIG. 12 is a structure corresponding to result 1 and result 2 of Case 4 in FIG. 6D. That is, in the wavelength conversion underlying layer 76 of FIG. 12, the low refractive underlying layer 26 may have a single-layer structure including a high refractive material, and the low refractive overlying layer 46a and 46b may be a multilayer including a first low refractive overlying layer 46a and a second low refractive overlying layer 46b having different refractive indices. The refractive index of the first low refractive overlying layer 46a may be less than the refractive index of the second low refractive overlying layer 46b. The wavelength conversion underlying layer 76 in FIG. 12 may include the same number of layers as that in FIG. 11. In the exemplary embodiment of FIG. 12, however, the low refractive underlying layer 26 may be made of a low refractive material. In addition, the low refractive underlying layer 26 may be made of the same material as the first low refractive overlying layer 46a. In an exemplary embodiment, the low refractive underlying layer 26 is made of $SiO_x$ and has a thickness of 0.06 μm. The first low refractive overlying layer 46a is made of $SiO_x$ and has a thickness of 0.08 μm. The second low refractive overlying layer 46b is made of $SiN_x$ and has a thickness of 0.02 μm. Accordingly, the blue light transmittance of the wavelength conversion underlying layer 76 is 81.4%. A wavelength conversion underlying layer 76 according to an exemplary embodiment is the same as the wavelength conversion underlying layer 76 of the above exemplary embodiment in terms of laminated materials, but is different in the thickness of each layer. The thickness of the low refractive underlying layer 26 is 0.04 μm. The thickness of the first low refractive overlying layer 46a is 0.08 μm. The thickness of the second low refractive overlying layer 46b is 0.02 μm. Accordingly, the blue light transmittance of the wavelength conversion underlying layer 76 is 81.3%.

Figure 13:
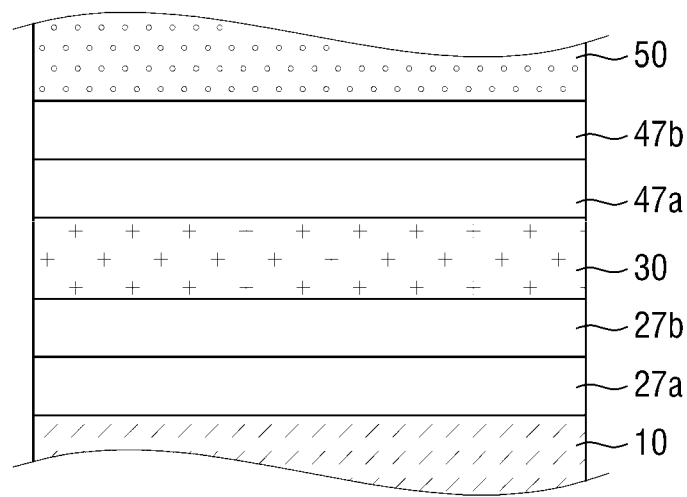

In FIG. 13, a low refractive underlying layer 27a and 27b and a low refractive overlying layer 47a and 47b of the wavelength conversion underlying layer 77 have a multilayer structure in which materials having different refractive indices are alternately laminated. The wavelength conversion underlying layer 77 of FIG. 13 is a structure corresponding to result 2 and result 3 of case 3 in FIG. 6C. That is, in the wavelength conversion underlying layer 77 of FIG. 13, the low refractive underlying layer 27a and 27b may be a multilayer including a first low refractive underlying layer 27a and a second low refractive underlying layer 27b having different refractive indices, and the low refractive overlying layer 47a and 47b may be a multilayer including a first low refractive overlying layer 47a and a second low refractive overlying layer 47b having different refractive indices. The refractive index of the first low refractive underlying layer 27a may be greater than that of the second low refractive underlying layer 27b. The refractive index of the first low refractive overlying layer 47a may be less than that of the second low refractive overlying layer 47b. In addition, the first low refractive underlying layer 27a may be made of the same material as the second low refractive overlying layer 47b, and the second low refractive underlying layer 27b may be made of the same material as the first low refractive overlying layer 47a. In an exemplary embodiment, the first low refractive underlying layer 27a is made of $SiN_x$ and has a thickness of 0.02 μm. The second low refractive underlying layer 27b is made of $SiO_x$ and has a thickness of 0.02 μm. The first low refractive overlying layer 47a is made of $SiO_x$ and has a thickness of 0.04 μm. The second low refractive overlying layer 47b is made of $SiN_x$ and has a thickness of 0.06 μm. Accordingly, the blue light transmittance of the wavelength conversion underlying layer 77 is 81.4%. A wavelength conversion underlying layer 77 according to an embodiment is the same as the wavelength conversion underlying layer 77 of the above exemplary embodiment in terms of laminated materials, but is different in the thickness of each layer. The thickness of the first low refractive underlying layer 27a is 0.02 μm. The thickness of the second low refractive overlying layer 47b is 0.04 μm. The thickness of the first low refractive overlying layer 47a is 0.02 μm. The thickness of the second low refractive overlying layer 47b is 0.08 μm. Accordingly, the blue light transmittance of the wavelength conversion underlying layer 77 is 81.4%.

Figure 14:
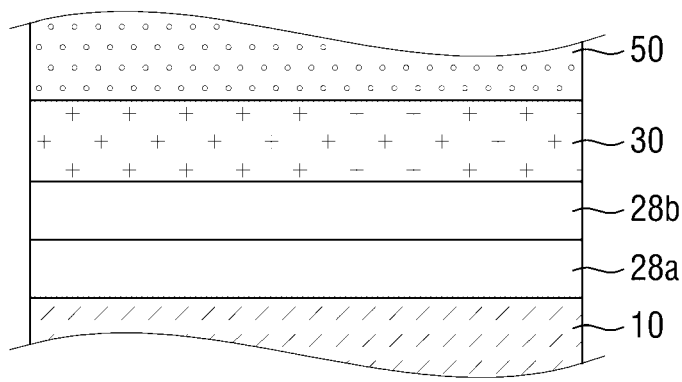

In FIG. 14, the wavelength conversion underlying layer 78 does not include a low refractive overlying layer, contrary to FIG. 10, and a low refractive underlying layer 28a and 28b has a multilayer structure. The wavelength conversion underlying layer 78 of FIG. 14 is a structure corresponding to result 3 of case 1 in FIG. 6A. That is, in the wavelength conversion underlying layer 78 of FIG. 14, the low refractive overlying layer is not provided, that is, has a thickness of 0 μm, and the low refractive underlying layer 28a and 28b may be a multilayer including a first low refractive underlying layer 28a and a second low refractive underlying layer 28b having different refractive indices. The refractive index of the first low refractive underlying layer 28a may be greater than that of the second low refractive underlying layer 28b. In an exemplary embodiment, the first low refractive underlying layer 28a is made of $SiN_x$ and has a thickness of 0.1 μm. The second low refractive underlying layer 28b is made of $SiO_x$ and has a thickness of 0.06 μm.

Accordingly, the blue light transmittance of the wavelength conversion underlying layer 78 is 81.3%.

Figures 15A, 15B:
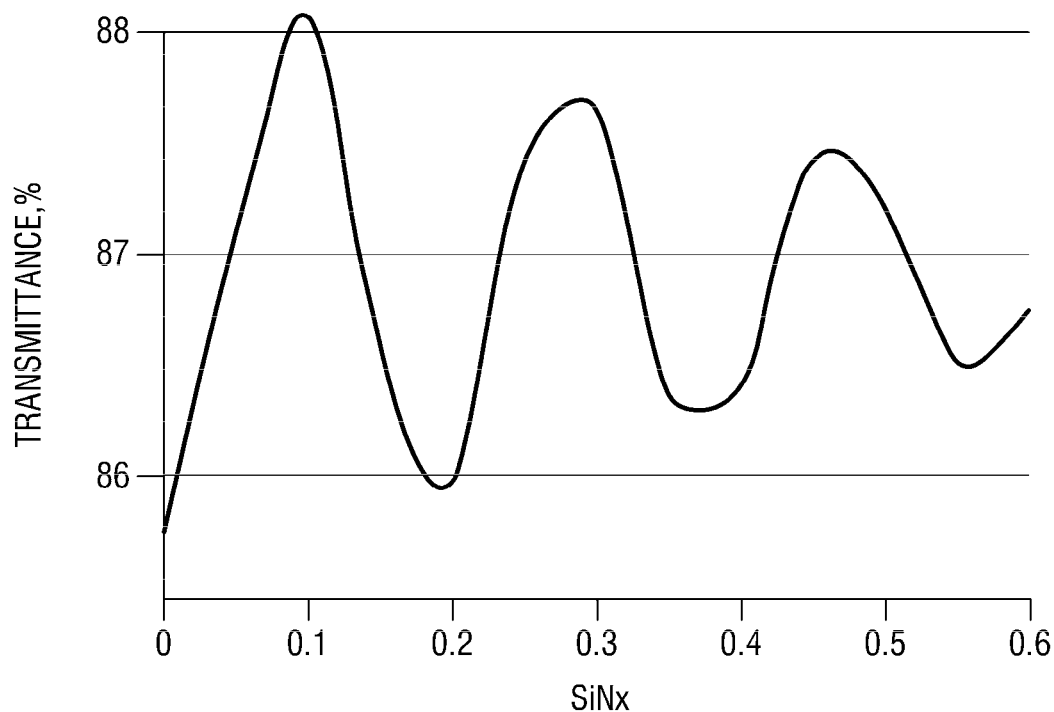
FIG. 15A is a table illustrating a wavelength conversion overlying layer according to exemplary embodiments.
FIG. 15B is a graph showing the change in transmittance with respect to the thickness of $SiN_x$ on a wavelength conversion layer.

FIG. 15A is a table illustrating lamination cases of a wavelength conversion overlying layer, and FIG. 15B is a graph showing the change in transmittance with respect to the thickness of $SiN_x$ on a wavelength conversion layer. The table in FIG. 16A shows the laminated structures and thicknesses for securing the maximum transmittance in each lamination case of the wavelength conversion overlying layer.

Referring to FIGS. 2 and 15A, the table illustrates conditions for performing a simulation. The wavelength conversion overlying layer 60 may be disposed on the wavelength conversion layer 50. The wavelength conversion overlying layer 60 may include a high refractive material, a low refractive material, and a transparent organic material. In an exemplary embodiment, the high refractive material may be silicon nitride ($SiN_x$), and the low refractive material may be silicon oxide ($SiO_x$). The high refractive material will hereinafter be described as $SiN_x$, and the low refractive material will hereinafter be described as $SiO_x$. The transparent organic material may be silicone resin, acrylic resin, or epoxy resin. Each layer including the high refractive material or the low refractive material may have a thickness of 0 to 0.2 μm. A layer including the transparent organic material may have a thickness of 0 μm to 5 μm. A thickness of 0 μm indicates that a corresponding layer is not included. There may be a total of six conditions according to the laminated structure of layers including the high refractive material, the low refractive material, and the transparent organic material. Hereinafter, three conditions exhibiting substantially high light transmittance will be described below.

The wavelength conversion overlying layer 60 of case 1 may have a structure in which layers including a high refractive material, a low refractive material, and a transparent organic material are sequentially laminated in this order on the wavelength conversion layer 50.

The wavelength conversion overlying layer 60 of case 2 may have a structure in which layers including a high refractive material, a transparent organic material, and a low refractive material are sequentially laminated in this order on the wavelength conversion layer 50.

The wavelength conversion overlying layer 60 of case 3 may include a structure in which layers including a transparent organic material, a high refractive material, and a low refractive material are sequentially laminated in this order on the wavelength conversion layer 50.

FIG. 15B is a graph showing the change in transmittance with respect to the thickness of $SiN_x$ disposed on the wavelength conversion layer 50 in case 2 of FIG. 15A. FIG. 15B is an example of simulation results, and the transmittance of the wavelength conversion overlying layer 60 having laminated structures of other cases can also be obtained in the same manner as in FIG. 15B. Here, the transmittance denotes the ratio of white light transmitted through the lower wavelength conversion overlying layer 60 to white light incident through the wavelength conversion layer 50. In the graph of FIG. 15B, $SiN_x$ refers to a high refractive material, and $SiO_x$ refers to a low refractive material.

Referring to FIG. 15B, it can be seen that the transmittance of the wavelength conversion overlying layer 60 changes as the $SiN_x$ thickness of the wavelength conversion overlying layer 60 changes. Since the influence of constructive interference or destructive interference of light changes according to the thickness of $SiN_x$, the light transmittance also changes. As the thickness of $SiN_x$ increases, the value of the maximum light transmittance tends to decrease due to the absorption of light by the material. The wavelength conversion overlying layer 60 according to case 2 has the maximum transmittance when the $SiN_x$ thickness is about 0.1 μm. In this way, the maximum transmittance in each lamination condition can be obtained by changing the laminated structure, such as the laminated order and laminated thickness of the wavelength conversion overlying layer 60, according to case 1 through case 3 shown in FIG. 15A.

FIGS. 16A to 16C are tables showing the laminated structures and thicknesses for securing the maximum transmittance in each lamination case of the wavelength conversion overlying layer. In FIGS. 16A to 16C, three result values with high transmittance are shown for each lamination case. In FIGS. 16A to 16C, $SiN_x$ is an example of a high refractive material, and $SiO_x$ is an example of a low refractive material. OC refers to a transparent organic material. If the maximum light transmittance in each case is obtained, the wavelength conversion overlying layer 60 may have a maximum light transmittance of 87.5 to 88.2%. Laminated structures of the wavelength conversion overlying layer 60 according to various exemplary embodiments will now be described in detail with reference to FIGS. 17 through 20.

FIGS. 17 through 20 are cross-sectional views of wavelength conversion overlying layers 61 through 64 according to exemplary embodiments. The wavelength conversion overlying layers in FIGS. 17 through 20 show that elements of a wavelength conversion overlying layer can be variously arranged. In order to effectively transmit light and prevent moisture/oxygen from penetrating into the wavelength conversion layer 50 the wavelength conversion overlying layers 61 through 64 may each have a multilayer structure in which layers including at least two of a high refractive material, a low refractive material, and a transparent organic material are laminated.

Figure 17:
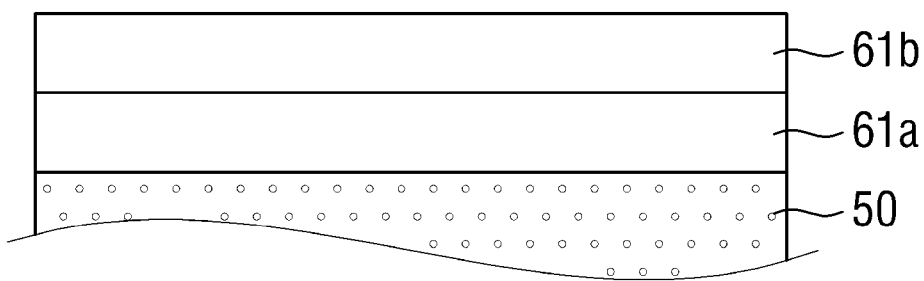
FIG. 17, FIG. 18, FIG. 19, and FIG. 20 are cross-sectional views of wavelength conversion overlying layers according to exemplary embodiments.

In FIG. 17, a wavelength conversion overlying layer 61a and 61b is disposed on the wavelength conversion layer 50 and has a multilayer structure including a first wavelength conversion overlying layer 61a and a second wavelength conversion overlying layer 61b. The wavelength conversion overlying layer 61a and 61b of FIG. 17 is a structure corresponding to result 1 through result 3 of case 1 in FIG. 16A. That is, the wavelength conversion overlying layer 61a and 61b of FIG. 17 may not include a high refractive material and may be a multilayer including the first wavelength conversion overlying layer 61a and the second wavelength conversion overlying layer 61b having different refractive indices. The refractive index of the first wavelength conversion overlying layer 61a may be greater than that of the second wavelength conversion overlying layer 61b. In an exemplary embodiment, the first wavelength conversion overlying layer 61a is made of $SiO_x$ and has a thickness of 0.1 μm. The second wavelength conversion overlying layer 61b is made of a transparent organic material and has a thickness of 2 μm. Accordingly, the white light transmittance of the wavelength conversion overlying layer 61a and 61b is 87.9%. A wavelength conversion overlying layer 61a and 61b according to an exemplary embodiment is the same as the wavelength conversion overlying layer 61a and 61b of the above exemplary embodiment in terms of laminated materials, but is different in the thickness of each layer. The thickness of the first wavelength conversion overlying layer 61a is 0.1 μm. The thickness of the second wavelength conversion overlying layer 61b is 3.5 μm. Accordingly, the white light transmittance of the wavelength conversion overlying layer is 61a and 61b is 87.7%. A wavelength conversion overlying layer 61a and 61b according to an exemplary embodiment is the same as the wavelength conversion overlying layer 61a and 61b of the above exemplary embodiment in terms of laminated materials, but is different in the thickness of each layer. The thickness of the first wavelength conversion overlying layer 61a is 0.1 μm. The thickness of the second wavelength conversion overlying layer 61b is 4.5 μm. Accordingly, the white light transmittance of the wavelength conversion overlying layer 61a and 61b is 87.5%.

Figure 18:
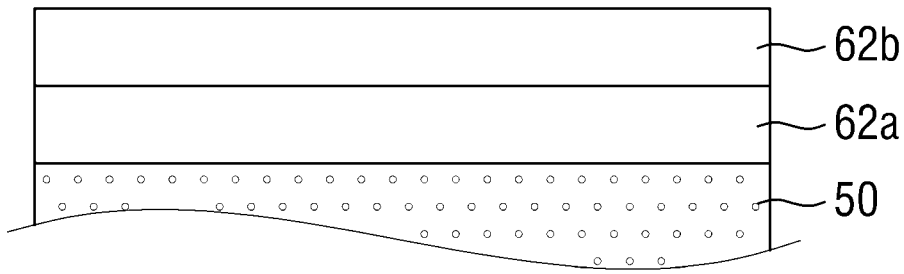

In FIG. 18, a wavelength conversion overlying layer 62a and 62b is disposed on the wavelength conversion layer 50 and has a multilayer structure including a first wavelength conversion overlying layer 62a and a second wavelength conversion overlying layer 62b. The wavelength conversion overlying layer 62a and 62b of FIG. 18 is a structure corresponding to result 1 through result 3 of case 2 in FIG. 16B. That is, the wavelength conversion overlying layer 62a and 62b of FIG. 18 may not include a transparent organic material, and may be a multilayer including the first wavelength conversion overlying layer 62a and the second wavelength conversion overlying layer 62b having different refractive indices. The refractive index of the first wavelength conversion overlying layer 62a may be greater than that of the second wavelength conversion overlying layer 62b. In an exemplary embodiment, the first wavelength conversion overlying layer 62a is made of $SiN_x$ and has a thickness of 0.1 μm. The second wavelength conversion overlying layer 62b is made of $SiO_x$ and has a thickness of 0.05 μm. Accordingly, the white light transmittance of the wavelength conversion overlying layer 62a and 62b is 88.2%. A wavelength conversion overlying layer 62a and 62b according to an exemplary embodiment is the same as the wavelength conversion overlying layer 62a and 62b of the above exemplary embodiment in terms of laminated materials, but is different in the thickness of each layer. The thickness of the first wavelength conversion overlying layer 62a is 0.1 μm. The thickness of the second wavelength conversion overlying layer 62b is 0.2 μm. Accordingly, the white light transmittance of the wavelength conversion overlying layers 62a and 62b is 87.9%. A wavelength conversion overlying layer 62a and 62b according to an exemplary embodiment is the same as the wavelength conversion overlying layer 62a and 62b of the above exemplary embodiment in terms of laminated materials, but is different in the thickness of each layer. The thickness of the first wavelength conversion overlying layer 62a is 0.1 μm. The thickness of the second wavelength conversion overlying layer 62b is 0.35 μm. Accordingly, the white light transmittance of the wavelength conversion overlying layer 62a and 62b is 87.7%.

Figure 19:
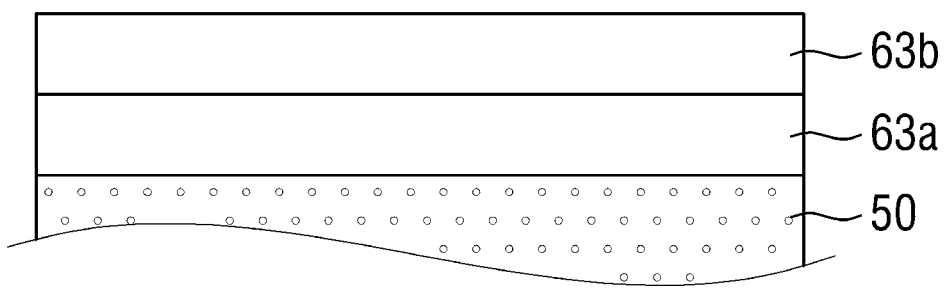

In FIG. 19, a wavelength conversion overlying layer 63a and 63b is disposed on the wavelength conversion layer 50 and has a multilayer structure including a first wavelength conversion overlying layer 63a and a second wavelength conversion overlying layer 63b. The wavelength conversion overlying layer 63a and 63b of FIG. 19 is a structure corresponding to result 1 of case 3 in FIG. 16C. That is, the wavelength conversion overlying layer 63a and 63b of FIG. 19 may not include a low refractive material and may be a multilayer including the first wavelength conversion overlying layer 63a and the second wavelength conversion overlying layer 63b having different refractive indices. The refractive index of the first wavelength conversion overlying layer 63a may be less than that of the second wavelength conversion overlying layer 63b. In an exemplary embodiment, the first wavelength conversion overlying layer 63a is made of a transparent organic material and has a thickness of 1 μm. The second wavelength conversion overlying layer 63b is made of SiNx and has a thickness of 0.05 μm. Accordingly, the white light transmittance of the wavelength conversion overlying layer 63a and 63b is 88.2%.

Figure 20:
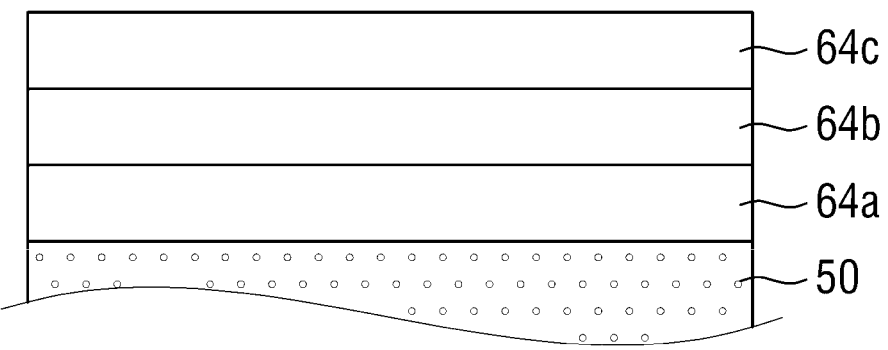

In FIG. 20, a wavelength conversion overlying layer 64a, 64b and 64c is disposed on the wavelength conversion layer 50 and has a multilayer structure including a first wavelength conversion overlying layer 64a, a second wavelength conversion overlying layer 64b and a third wavelength conversion overlying layer 64c. The wavelength conversion overlying layer 64a, 64b, and 64c of FIG. 20 is a structure corresponding to result 2 and result 3 of case 3 in FIG. 16C. That is, the wavelength conversion overlying layer 64a, 64b, and 64c of FIG. 20 may be a multilayer including the first wavelength conversion overlying layer 64a, the second wavelength conversion overlying layer 64b, and the third wavelength conversion overlying layer 64c having different refractive indices. The refractive index of the first wavelength conversion overlying layer 64a may be the smallest, and the refractive index of the second wavelength conversion overlying layer 64b may be the largest. The refractive index of the third wavelength conversion overlying layer 64c may be greater than the refractive index of the first wavelength conversion overlying layer 64a and less than the refractive index of the second wavelength conversion overlying layer 64b. In an exemplary embodiment, the first wavelength conversion overlying layer 64a is made of a transparent organic material and has a thickness of 1 μm. The second wavelength conversion overlying layer 64b is made of $SiN_x$ and has a thickness of 0.05 μm. The third wavelength conversion overlying layer 64c is made of $SiO_x$ and has a thickness of 0.05 μm. Accordingly, the white light transmittance of the wavelength conversion overlying layer 64a, 64b, and 64c is 88.2%. A wavelength conversion overlying layer 64a, 64b, and 64c according to an exemplary embodiment is the same as the wavelength conversion overlying layer 64a, 64b, and 64c of the above exemplary embodiment in terms of laminated materials, but is different in the thickness of each layer. The thickness of the first wavelength conversion overlying layer 64a is 1 μm. The thickness of the second wavelength conversion overlying layer 64b is 0.05 μm. The thickness of the third wavelength conversion overlying layer 64c is 0.3 μm. Accordingly, the white light transmittance of the wavelength conversion overlying layer 64a, 64b and 64c is 88.2%.

Figure 21:
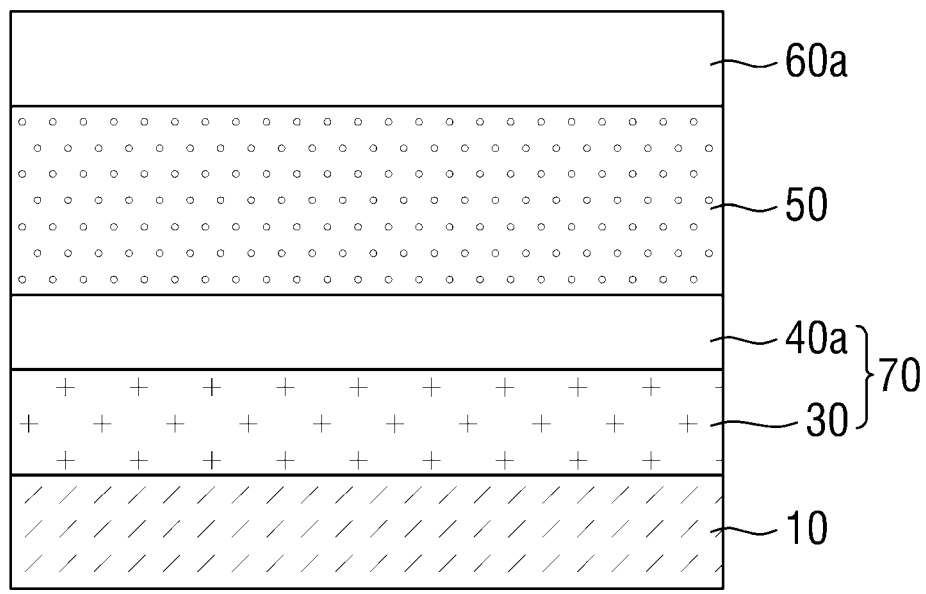
FIG. 21, FIG. 22, and FIG. 23 are cross-sectional views of optical members according to exemplary embodiments.
Figure 22:
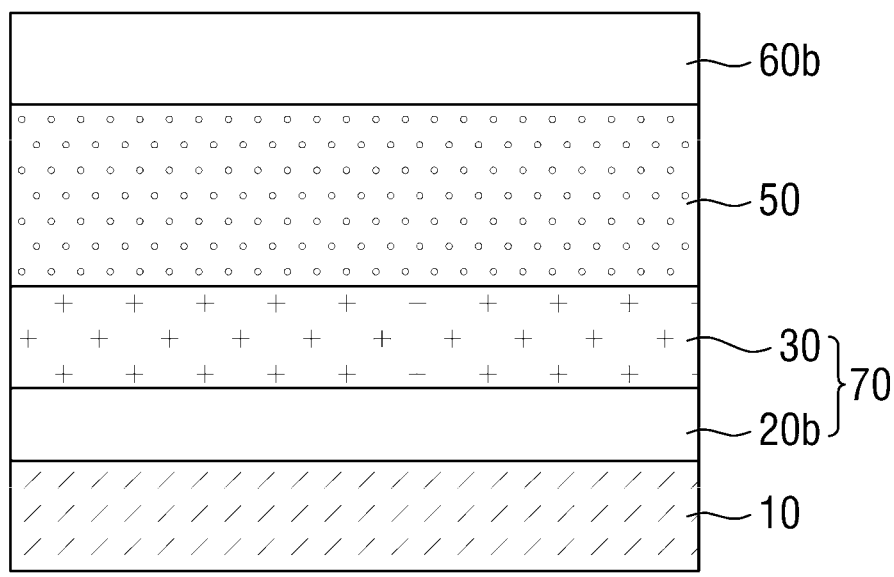
Figure 23:
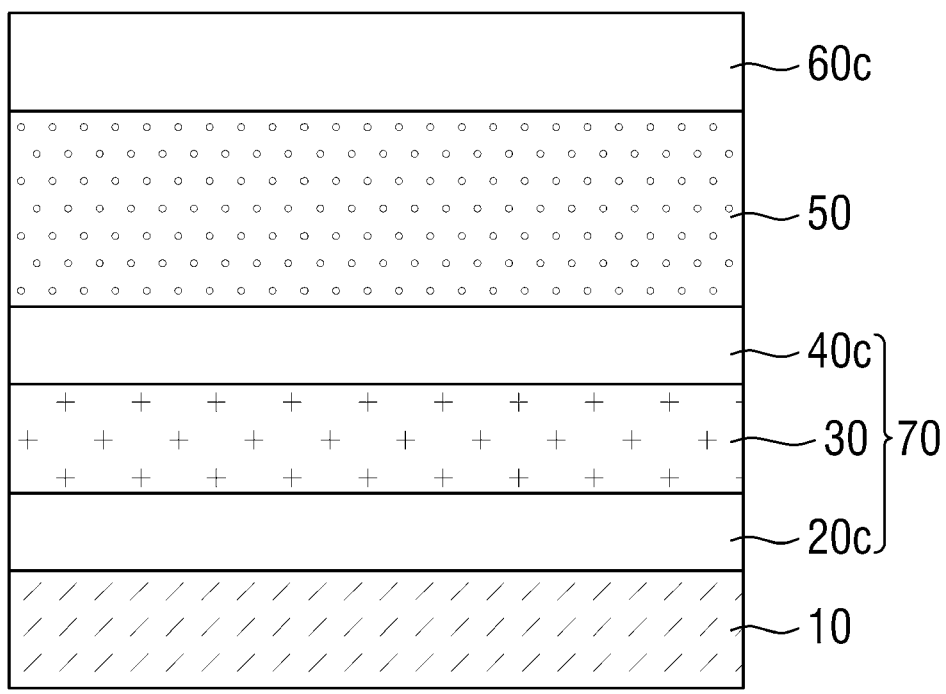

FIGS. 21 through 23 are cross-sectional views of optical members 101 through 103 according to exemplary embodiments. The optical members 101 of FIGS. 21 through 23 show that the wavelength conversion underlying layer 70 and the wavelength conversion overlying layer 60 described above can be variously combined. The structures of the eight wavelength conversion underlying layers 71 through 78 described above with reference to FIGS. 7 through 14 and the structures of the four wavelength conversion overlying layers 61 through 64 described above with reference to FIGS. 17 through 20 can be combined to produce 32 optical members (101, 102, 103) according to exemplary embodiments. However, the laminated structure of an optical member is not limited to the above examples, and various other laminated structures can be applied. In optical members according to exemplary embodiments, the wavelength conversion underlying layers 71 through 78 described above with reference to FIGS. 7 through 14 may be divided into the wavelength conversion underlying layer 74 not including the low refractive underlying layer 20, the wavelength conversion underlying layer 78 not including the low refractive overlying layer 40, and the wavelength conversion underlying layers 71, 72, 73, 75, 76 and 77 including both the low refractive underlying layer and the low refractive overlying layer. The wavelength conversion overlying layer 60 may be any one of the four wavelength conversion overlying layers 61 through 64 described above with reference to FIGS. 17 through 20.

The final light transmittance of the optical member 100 may be obtained by multiplying the blue light transmittance of the wavelength conversion underlying layer 70 by the white light transmittance of the wavelength conversion overlying layer 60.

Referring to FIG. 21, the optical member 101 according to an exemplary embodiment may include a wavelength conversion underlying layer 70 and a wavelength conversion overlying layer 60a. The wavelength conversion underlying layer 70 may include a low refractive layer 30 and a low refractive overlying layer 40a, but may not include a low refractive underlying layer. The wavelength conversion underlying layer 70 may be the wavelength conversion underlying layer 74 described in FIG. 10. That is, the wavelength conversion underlying layer 70 may be a wavelength conversion underlying layer not including a low refractive underlying layer and including the low refractive overlying layer 40a having a multilayer structure. The wavelength conversion overlying layer 60a may have a multilayer structure in which layers including inorganic or organic materials are laminated.

Referring to FIG. 22, the optical member 102 according to an exemplary embodiment may include a wavelength conversion underlying layer 70 and a wavelength conversion overlying layer 60b. The wavelength conversion underlying layer 70 may include a low refractive underlying layer 20b and a low refractive layer 30, but may not include a low refractive overlying layer. The wavelength conversion underlying layer 70 may be the wavelength conversion underlying layer 78 described in FIG. 14. That is, the wavelength conversion underlying layer 70 may be a wavelength conversion underlying layer not including a low refractive overlying layer and including the lode refractive underlying layer 20b having a multilayer structure. The wavelength conversion overlying layer 60b may have a multilayer structure in which layers including inorganic or organic materials are laminated.

Referring to FIG. 23, the optical member 103 according to an exemplary is embodiment may include a wavelength conversion underlying layer 70 and a wavelength conversion overlying layer 60c. The wavelength conversion underlying layer 70 may include a low refractive underlying layer 20c, a low refractive layer 30, and a low refractive overlying layer 40c. The wavelength conversion underlying layer 70 may be any one of the wavelength conversion underlying layers 71, 72, 73, 75, 76, and 77 according to exemplary embodiments, excluding the wavelength conversion underlying layers 74 and 78 of FIGS. 10 and 14 from the wavelength conversion underlying layers 71 through 78 described above with reference to FIGS. 7 through 14. That is, the wavelength conversion underlying layer 70 may include the low refractive underlying layer 20c having a single-layer structure or a multilayer structure, and the low refractive overlying layer 40c having a single-layer structure or a multilayer structure. The wavelength conversion overlying layer 60c may be a multilayer structure in which layers including inorganic or organic materials are laminated.

Figure 24:
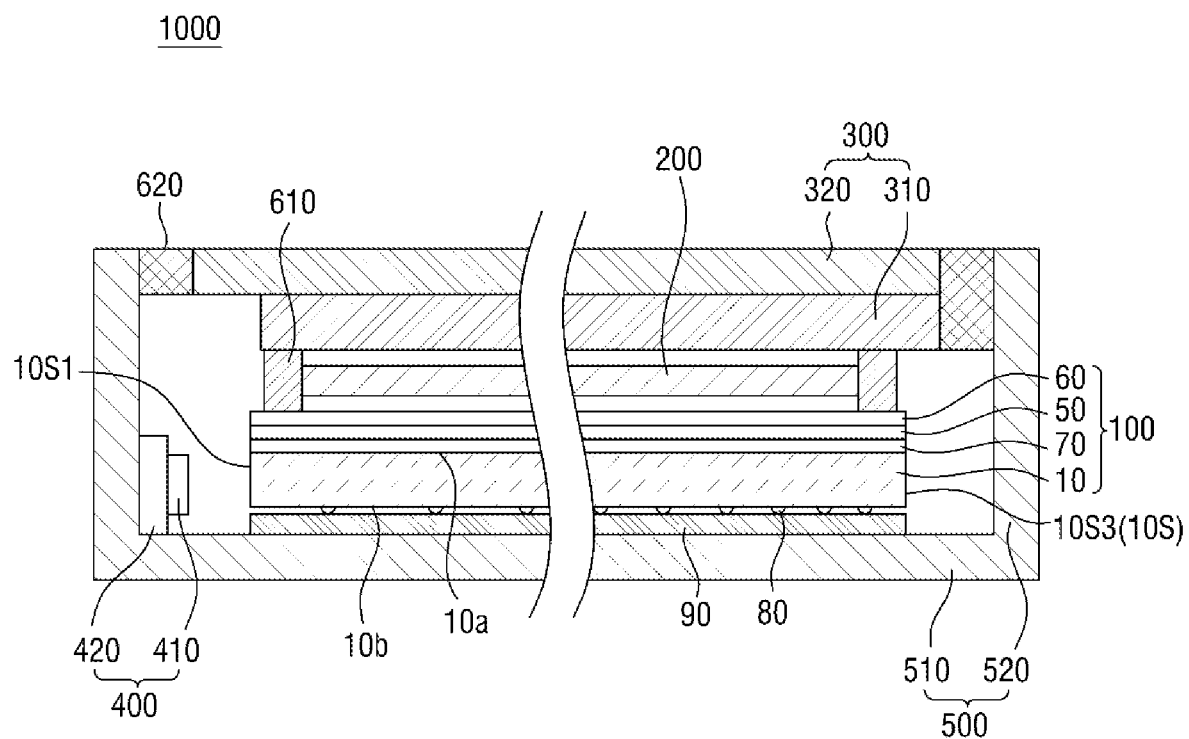
FIG. 24 is a cross-sectional view of a display according to an exemplary embodiment.

FIG. 24 is a cross-sectional view of a display 1000 according to an exemplary embodiment.

Referring to FIG. 24, the display 1000 includes a light source 400, an optical member 100 disposed on an emission path of the light source 400, and a display panel 300 disposed above the optical member 100.

All optical members according to the above-described exemplary embodiments can be applied as the optical member 100. In FIG. 24, a display will be described as including the optical member 100 of FIG. 2 as an example.

The light source 400 is disposed on a side of the optical member 100. The light source 400 may be disposed adjacent to a light incidence surface 10S1 of a light guide plate 10 of the optical member 100. The light source 400 may include a plurality of point light sources or linear light sources. The point light sources may be LED light sources 410. The LED light sources 410 may be mounted on a printed circuit board 420. The LED light sources 410 may emit light of a blue wavelength.

As illustrated in FIG. 24, the LED light sources 410 may be top-emitting LEDs that emit light through their top surfaces. In this case, the printed circuit board 420 may be disposed on a sidewall 520 of the housing 500.

The light of the blue wavelength emitted from the LED light sources 410 is incident on the light guide plate 10 of the optical member 100. The light guide plate 10 of the optical member 100 guides the light and outputs the light through an upper surface 10a or a lower surface 10b. A wavelength conversion layer 50 of the optical member 100 converts part of the light of the blue wavelength incident from the light guide plate 10 into other wavelengths, such as a green wavelength and a red wavelength. The light of the green wavelength and the light of the red wavelength are emitted upward together with the unconverted light of the blue wavelength toward the display panel 300.

Scattering patterns 80 may be disposed on the lower surface 10b of the light guide plate 10. The scattering patterns 80 change the angle of light propagating in the light guide plate 10 through total reflection and output the light having the changed angle to the outside of the light guide plate 10.

In an exemplary embodiment, the scattering patterns 80 may be provided as a separate layer or separate patterns. For example, a pattern layer including protruding patterns and/or concave groove patterns may be formed on the lower surface 10b of the light guide plate 10, or printed patterns may be formed on the lower surface 10b of the light guide plate 10 to function as the scattering patterns 80.

In an exemplary embodiment, the scattering patterns 80 may be formed of the surface shape of the light guide plate 10 itself. For example, concave grooves may be formed on the lower surface 10b of the light guide plate 10 to function as the scattering patterns 80.

The arrangement density of the scattering patterns 80 may differ depending on area. For example, the arrangement density of the scattering patterns 80 may be low in an area adjacent to the light incidence surface $10s1$ to which a relatively large amount of light is provided, and may be high in an area adjacent to a counter surface $10s3$ to which a relatively small amount of light is provided.

The display 1000 may further include a reflective member 90 disposed under the optical member 100. The reflective member 90 may include a reflective film or a reflective coating layer. The reflective member 90 reflects light output from the lower surface 10b of the light guide plate 10 of the optical member 100 back into the light guide plate 10.

The display panel 300 is disposed above the optical member 100. The display panel 300 receives light from the optical member 100 and displays a screen. Examples of such a light-receiving display panel that receives light and displays a screen include a liquid crystal display panel and an electrophoretic panel. Hereinafter, the display panel 300 will be described as including a liquid crystal display panel, but the inventive concepts are not limited thereto, and various other light-receiving display panels can be applied as the display panel 300.

The display panel 300 may include a first substrate 310, a second substrate 320 facing the first substrate 310, and a liquid crystal layer disposed between the first substrate 310 and the second substrate 320. The first substrate 310 and the second substrate 320 overlap each other. In an exemplary embodiment, any one of the first and second substrates 310 and 320 may be larger than the other substrate and protrude further outward than the other substrate. FIG. 24 shows that the second substrate 320 disposed on the first substrate 310 is larger and protrudes on a side where the light source 400 is disposed. The protruding area of the second substrate 320 may provide a space in which a driving chip or an external circuit board is mounted. Unlike in the above example, the first substrate 310 disposed under the second substrate 320 may be greater in size than the second substrate 320 and may protrude outward. An overlapping area of the first substrate 310 and the second substrate 320 excluding the protruding area in the display panel 300 may be substantially aligned with side surfaces 10s of the light guide plate 10 of the optical member 100.

The optical member 100 may be coupled to the display panel 300 by an inter-module coupling member 610. The inter-module coupling member 610 may be shaped like a quadrilateral frame in plan view. The inter-module coupling member 610 may be located at edge portions of the display panel 300 and the optical member 100.

In an exemplary embodiment, a lower surface of the inter-module coupling member 610 is disposed on an upper surface of a wavelength conversion overlying layer 60 of the optical member 100. The lower surface of the inter-module coupling member 610 may be disposed on the wavelength conversion overlying layer 60 to overlap only an upper surface of the wavelength conversion layer 50 and not overlap side surfaces of the wavelength conversion layer 50.

The inter-module coupling member 610 may include a polymer resin or an adhesive or sticky tape.

In an exemplary embodiment, the inter-module coupling member 610 may further perform a light transmission blocking function. For example, the inter-module coupling member 610 may include a light absorbing material, such as a black pigment or a dye, or may include a reflective material to perform the light transmission blocking function.

The display 1000 may further include the housing 500. The housing 500 has an open surface, and includes a bottom surface 510 and sidewalls 520 connected to the bottom surface 510. The light source 400, the optical member 100, and the display panel 300 attached to each other, and the reflective member 90 may be accommodated in a space defined by the bottom surface 510 and the sidewalls 520. The light source 400, the reflective member 90, and the optical member 100, and the display panel 300 attached to each other are disposed on the bottom surface 510 of the housing 500. The height of the sidewalls 520 of the housing 500 may be substantially the same as the height of the optical member 100 and the display panel 300 attached to each other inside the housing 500. The display panel 300 may be disposed adjacent to an upper end of each sidewall 520 of the housing 500 and may be coupled to the upper end of each sidewall 520 of the housing 500 by a housing coupling member 620. The housing coupling member 620 may be shaped like a quadrilateral frame in plain view. The housing coupling member 620 may include a polymer resin or an adhesive or sticky tape.

The display 1000 may further include at least one optical film 200. One or more optical films 200 may be accommodated in a space surrounded by the inter-module coupling member 610 between the optical member 100 and the display panel 300. Side surfaces of one or more optical films 200 may be in contact with and attached to inner side surfaces of the inter-module coupling members 610. Although FIG. 24 shows that there is a gap between the optical film 200 and the optical member 100, and between the optical film 200 and the display panel 300, the gap is not necessarily required and may be omitted.

The optical film 200 may be a prism film, a diffusion film, a micro-lens film, a lenticular film, a polarizing film, a reflective polarizing film, or a retardation film. The display 1000 may include a plurality of optical films 200 of the same type or different types. When a plurality of optical films 200 are applied, the optical films 200 may be placed to overlap each other, and side surfaces of the optical films 200 may be in contact with and attached to the inner side surfaces of the inter-module coupling member 610. The optical films 200 may be separated from each other, and an air layer may be disposed between the optical films 200.

In the display 1000 according to the exemplary embodiment of FIG. 24, the optical member 100 and the display panel 300 and, further, the optical film 200 are integrated with each other by the inter-module coupling member 610, and the display panel 300 and the housing 500 are coupled to each other by the housing coupling member 620. Therefore, even if a mold frame is omitted, stable coupling of various members is possible, thus reducing the weight of the display 1000. In addition, since the light guide plate 10 and the wavelength conversion layer 50 are integrated with each other, the thickness of the display 1000 can be reduced. Furthermore, since side surfaces of the display panel 300 are coupled to the sidewalls 520 of the housing 500 by the housing coupling member 620, a bezel space on the display screen side can be eliminated or minimized.

Figure 25:
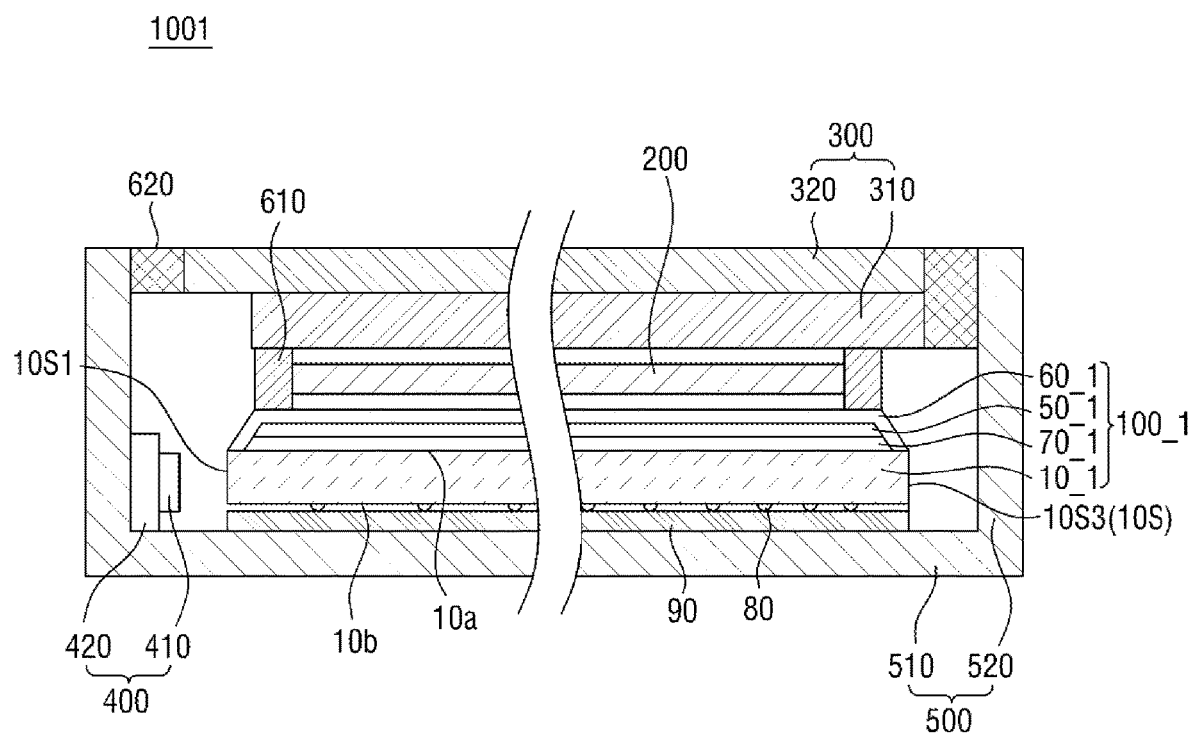
FIG. 25 is a cross-sectional view of a display according to an exemplary embodiment.

FIG. 25 is a cross-sectional view of a display 1001 according to an exemplary embodiment.

Referring to FIG. 25, the display 1001 includes a light source 400, an optical member 100_1 disposed on an emission path of the light source 400, and a display panel 300 disposed above the optical member 100_1. Unlike the display 1000 of FIG. 24, the display 1001 illustrated in FIG. 25 includes the optical member 100_1, in which a wavelength conversion overlying layer 60_1 covers upper and side surfaces of a wavelength conversion layer 50_1, and side surfaces of a wavelength conversion underlying layer 70_1.

The wavelength conversion layer 50_1, particularly wavelength conversion particles included in the wavelength conversion layer 50_1, is vulnerable to moisture/oxygen. In the case of a wavelength conversion film, a barrier film is laminated on upper and lower surfaces of a wavelength conversion layer to prevent the penetration of moisture/oxygen into the wavelength conversion layer. In the illustrated exemplary embodiment, however, since the wavelength conversion layer 50_1 is directly disposed without a barrier film, a sealing structure for protecting the wavelength conversion layer 50_1 is required. The sealing structure may be realized by the wavelength conversion overlying layer 60_1 and a light guide plate 10_1.

The gates through which moisture can penetrate into the wavelength conversion layer 50_1 are the upper surface, the side surfaces, and a lower surface of the wavelength conversion layer 50_1. As described above, since the upper surface and the side surfaces of the wavelength conversion layer 50_1 are covered and protected by the wavelength conversion overlying layer 60_1, the penetration of moisture/oxygen can be blocked or at least reduced.

On the other hand, the lower surface of the wavelength conversion layer 50_1 is in contact with an upper surface of the wavelength conversion underlying layer 70_1. If the wavelength conversion underlying layer 70_1 includes voids VD or is made of an organic material, the movement of moisture in the wavelength conversion underlying layer 70_1 is possible. Therefore, moisture/oxygen can be introduced into the lower surface of the wavelength conversion layer 50_1 through the wavelength conversion underlying layer 70_1. However, since the wavelength conversion underlying layer 70_1 according to an exemplary embodiment also has a sealing structure, penetration of moisture/oxygen through the lower surface of the wavelength conversion layer 50_1 can be blocked at source.

Specifically, since the side surfaces of the wavelength conversion underlying layer 70_1 are covered and protected by the wavelength conversion overlying layer 60_1, penetration of moisture/oxygen through the side surfaces of the wavelength conversion underlying layer 70_1 can be blocked/reduced. Even if the wavelength conversion underlying layer 70_1 protrudes further than the wavelength conversion layer 50_1, such that a portion of the upper surface is exposed, since the exposed portion is covered and protected by the wavelength conversion overlying layer 60_1, penetration of moisture/oxygen through the exposed portion can be blocked/reduced. A lower surface of the wavelength conversion underlying layer 70_1 is in contact with the light guide plate 10_1. When the light guide plate 10_1 is made of an inorganic material such as glass, it can block/reduce the penetration of moisture/oxygen, like the wavelength conversion overlying layer 60_1. That is, since the surfaces of a laminate of the wavelength conversion underlying layer 70_1 and the wavelength conversion layer 50_1 are surrounded and sealed by the wavelength conversion overlying layer 60_1 and the light guide plate 10_1, even if a moisture/oxygen movement path is formed inside the wavelength conversion underlying layer 70_1, penetration of moisture/oxygen can be blocked/reduced by the above sealing structure. Therefore, deterioration of the wavelength conversion particles due to moisture/oxygen can be prevented or at least mitigated.

An optical member according to an exemplary embodiment can simultaneously perform a light guide function and a wavelength conversion function while improving light transmission efficiency through a laminated structure of materials having different refractive indices. The optical member according to an exemplary embodiment is relatively thin and can improve the optical characteristics of a display by maximizing the light transmission efficiency.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical member comprising:
   a light guide plate;
   a low refractive layer disposed on the light guide plate and having a refractive index less than that of the light guide plate;
   a low refractive underlying layer disposed between the low refractive layer and the light guide plate, the low refractive underlying layer comprising a first low refractive underlying layer disposed on the light guide plate and a second low refractive underlying layer disposed on the first low refractive underlying layer; and
   a wavelength conversion layer disposed on the low refractive layer.

2. The optical member of claim 1, wherein:
   a lower surface of the low refractive underlying layer contacts an upper surface of the light guide plate; and
   an upper surface of the low refractive underlying layer contacts a lower surface of the low refractive layer.

3. The optical member of claim 2, wherein the low refractive underlying layer comprises at least one of a low refractive material having a refractive index of 1.3 to 1.7 and a high refractive material having a refractive index of 1.5 to 2.2.

4. The optical member of claim 3, wherein a refractive index of the low refractive underlying layer is greater than that of the low refractive layer.

5. The optical member of claim 4, wherein the low refractive underlying layer has a thickness less than that of the low refractive layer.

6. The optical member of claim 5, wherein one of the first low refractive underlying layer and the second low refractive underlying layer comprises the low refractive material, and the other one of the first low refractive underlying layer and the second low refractive underlying layer comprises the high refractive material.

7. The optical member of claim 6, wherein each of the first low refractive underlying layer and the second low refractive underlying layer has a thickness of 0.2 μm or less.

8. The optical member of claim 6, wherein the low refractive material comprises $SiO_x$, and the high refractive material comprises $SiN_x$.

9. The optical member of claim 1, wherein the difference in refractive index between the light guide plate and the low refractive layer is 0.2 or more.

10. The optical member of claim 9, wherein the low refractive layer comprises voids.

11. The optical member of claim 9, wherein the refractive index of the low refractive layer is 1.2 to 1.3.

12. The optical member of claim 11, wherein the thickness of the low refractive layer is 0.8 to 1.2 μm.

13. The optical member of claim 1, further comprising a wavelength conversion overlying layer disposed on the wavelength conversion layer.

14. The optical member of claim 13, wherein a lower surface of the wavelength conversion overlying layer is parallel to the upper surface of the light guide plate.

15. The optical member of claim 14, wherein the wavelength conversion overlying layer comprises at least one of $SiO_x$ and $SiN_x$.

16. The optical member of claim 15, wherein the wavelength conversion overlying layer comprises:
    a first wavelength conversion overlying layer disposed on the wavelength conversion layer; and
    a second wavelength conversion overlying layer disposed on the first wavelength conversion overlying layer.

17. The optical member of claim 16, wherein one of the first wavelength conversion overlying layer and the second wavelength conversion overlying layer comprises a transparent organic material, and the other one of the first wavelength conversion overlying layer and the second wavelength conversion overlying layer comprises at least one of $SiO_x$ and $SiN_x$.

18. The optical member of claim 17, wherein:
the first wavelength conversion overlying layer comprises $SiO_x$; and
the second wavelength conversion overlying layer comprises a transparent organic material.

19. The optical member of claim 16, wherein one of the first wavelength conversion overlying layer and the second wavelength conversion overlying layer comprises $SiO_x$ and the other one of the first wavelength conversion overlying layer and the second wavelength conversion overlying layer comprises $SiN_x$.

20. The optical member of claim 16, wherein the wavelength conversion overlying layer further comprises a third wavelength conversion overlying layer disposed on the second wavelength conversion overlying layer.

21. The optical member of claim 20, wherein the first wavelength conversion overlying layer comprises a transparent organic material.

22. The optical member of claim 21, wherein one of the second wavelength conversion overlying layer and the third wavelength conversion overlying layer comprises $SiO_x$, and the other one of the first wavelength conversion overlying layer and the second wavelength conversion overlying layer comprises $SiN_x$.

23. The optical member of claim 1, wherein the light guide plate comprises glass.

24. The optical member of claim 23, wherein the upper surface of the light guide plate is parallel to the lower surface of the low refractive layer.

25. An optical member comprising:
a light guide plate;
a low refractive layer disposed on the light guide plate and having a refractive index less than that of the light guide plate;
a low refractive underlying layer disposed between the low refractive layer and the light guide plate;
a wavelength conversion layer disposed on the low refractive layer; and
a low refractive overlying layer disposed between the low refractive layer and the wavelength conversion layer, the low refractive overlying layer comprising at least one of $SiO_x$ and $SiN_x$, and having a refractive index greater than that of the low refractive layer.

26. The optical member of claim 25, wherein the low refractive overlying layer comprises at least one of a low refractive material having a refractive index of 1.3 to 1.7 and a high refractive material having a refractive index of 1.5 to 2.2.

27. The optical member of claim 25, wherein the low refractive overlying layer comprises:
a first low refractive overlying layer disposed on the low refractive layer; and
a second low refractive overlying layer disposed on the first low refractive overlying layer.

28. The optical member of claim 27, wherein one of the first low refractive overlying layer and the second low refractive overlying layer comprises the low refractive material, and the other one of the first low refractive overlying layer and the second low refractive overlying layer comprises the high refractive material.

29. The optical member of claim 28, wherein each of the first low refractive overlying layer and the second low refractive overlying layer has a thickness of 0.2 µm or less.

30. The optical member of claim 29, wherein the low refractive material comprises $SiO_x$ and the high refractive material comprises $SiN_x$.

31. The optical member of claim 25, further comprising a wavelength conversion overlying layer disposed on the wavelength conversion layer.

32. The optical member of claim 31, wherein the wavelength conversion overlying layer comprises at least one of $SiO_x$ and $SiN_x$.

33. The optical member of claim 32, wherein the wavelength conversion overlying layer comprises:
a first wavelength conversion overlying layer disposed on the wavelength conversion layer; and
a second wavelength conversion overlying layer disposed on the first wavelength conversion overlying layer.

34. The optical member of claim 33, wherein one of the first wavelength conversion overlying layer and the second wavelength conversion overlying layer comprises a transparent organic material, and the other one of the first wavelength conversion overlying layer and the second wavelength conversion overlying layer comprises at least one of $SiO_x$ and $SiN_x$.

35. The optical member of claim 34, wherein:
the first wavelength conversion overlying layer comprises $SiO_x$; and
the second wavelength conversion overlying layer comprises a transparent organic material.

36. The optical member of claim 33, wherein the wavelength conversion overlying layer further comprises a third wavelength conversion overlying layer disposed on the second wavelength conversion overlying layer.

37. An optical member comprising:
a light guide plate;
a low refractive layer disposed on the light guide plate and having a refractive index less than that of the light guide plate;
a wavelength conversion layer disposed on the low refractive layer;
a low refractive underlying layer disposed between the low refractive layer and the light guide plate, the low refractive underlying layer comprising at least one of $SiO_x$ and $SiN_x$, and having a refractive index greater than that of the low refractive layer; and
a low refractive overlying layer disposed between the low refractive layer and the wavelength conversion layer.

38. The optical member of claim 37, wherein the low refractive underlying layer comprises:
a first low refractive underlying layer disposed on the light guide plate; and
a second low refractive underlying layer disposed on the first low refractive underlying layer.

39. The optical member of claim 38, wherein each of the first low refractive underlying layer and the second low refractive underlying layer has a thickness of 0.2 µm or less.

40. The optical member of claim 37, wherein:
the low refractive overlying layer comprises at least one of $SiO_x$ and $SiN_x$; and
a refractive index of the low refractive overlying layer is greater than that of the low refractive layer.

41. The optical member of claim 40, wherein the low refractive overlying layer comprises:
a first low refractive overlying layer disposed on the low refractive layer; and
a second low refractive overlying layer disposed on the first low refractive overlying layer.

42. The optical member of claim 41, wherein each of the first low refractive overlying layer and the second low refractive overlying layer has a thickness of 0.2 µm or less.

43. The optical member of claim 37, further comprising a wavelength conversion overlying layer disposed on the wavelength conversion layer,
wherein the wavelength conversion overlying layer comprises at least one of $SiO_x$ and $SiN_x$.

44. The optical member of claim 43, wherein the wavelength conversion overlying layer comprises:
a first wavelength conversion overlying layer disposed on the wavelength conversion layer; and
a second wavelength conversion overlying layer disposed on the first wavelength conversion overlying layer.

45. The optical member of claim 44, wherein one of the first wavelength conversion overlying layer and the second wavelength conversion overlying layer comprises a transparent organic material, and the other one of the first wavelength conversion overlying layer and the second wavelength conversion overlying layer comprises at least one of $SiO_x$ and $SiN_x$.

46. The optical member of claim 45, wherein:
the first wavelength conversion overlying layer comprises $SiO_x$; and
the second wavelength conversion overlying layer comprises a transparent organic material.

47. The optical member of claim 44, wherein the wavelength conversion overlying layer further comprises a third wavelength conversion overlying layer disposed on the second wavelength conversion overlying layer.

48. A display comprising:
an optical member comprising a light guide plate, a low refractive layer disposed on the light guide plate and having a refractive index less than that of the light guide plate, a low refractive underlying layer disposed between the low refractive layer and the light guide plate, and a wavelength conversion layer disposed on the low refractive layer;
a light source disposed on at least one side of the light guide plate; and
a display panel disposed on the optical member,
wherein the low refractive underlying layer comprises a first low refractive underlying layer disposed on the light guide plate and a second low refractive underlying layer disposed on the first low refractive underlying layer.

49. The display of claim 48, wherein:
the low refractive underlying layer comprises at least one of $SiO_x$ and $SiN_x$; and
a refractive index of the low refractive underlying layer is greater than that of the low refractive layer.

50. The display of claim 49, wherein:
the low refractive underlying layer comprises a first low refractive underlying layer disposed on the light guide plate; and
a second low refractive underlying layer disposed on the first low refractive underlying layer.

51. The display of claim 48, further comprising a wavelength conversion overlying layer disposed on the wavelength conversion layer,
wherein the wavelength conversion overlying layer comprises at least one of $SiO_x$ and $SiN_x$.

52. The display of claim 51, wherein:
the wavelength conversion overlying layer comprises a first wavelength conversion overlying layer disposed on the wavelength conversion layer; and
a second wavelength conversion overlying layer disposed on the first wavelength conversion overlying layer.

53. The display of claim 52, wherein the wavelength conversion overlying layer further comprises a third wavelength conversion overlying layer disposed on the second wavelength conversion overlying layer.

54. The display of claim 48, wherein the optical member further comprises a low refractive overlying layer disposed between the low refractive layer and the wavelength conversion layer.

55. The display of claim 54, wherein:
the low refractive overlying layer comprises at least one of $SiO_x$ and $SiN_x$; and
a refractive index of the low refractive overlying layer is greater than that of the low refractive layer.

56. The display of claim 55, further comprising a wavelength conversion overlying layer disposed on the wavelength conversion layer,
wherein the wavelength conversion overlying layer comprises at least one of $SiO_x$ and $SiN_x$.

57. A display comprising:
an optical member comprising a light guide plate, a low refractive layer disposed on the light guide plate and having a refractive index less than that of the light guide plate, a wavelength conversion layer disposed on the low refractive layer, a low refractive underlying layer disposed between the low refractive layer and the light guide plate, and a low refractive overlying layer disposed between the low refractive layer and the wavelength conversion layer;
a light source disposed on at least one side of the light guide plate; and
a display panel disposed on the optical member,
wherein at least one of the low refractive underlying layer and the low refractive overlying layer comprises at least one of $SiO_x$ and $SiN_x$, and has a refractive index greater than that of the low refractive layer.

58. The display of claim 57, wherein:
the low refractive overlying layer comprises at least one of $SiO_x$ and $SiN_x$; and
a refractive index of the low refractive overlying layer is greater than that of the low refractive layer.

59. The display of claim 58, further comprising a wavelength conversion overlying layer disposed on the wavelength conversion layer,
wherein the wavelength conversion overlying layer comprises at least one of $SiO_x$ and $SiN_x$.

* * * * *